United States Patent
Numao et al.

(10) Patent No.: US 10,987,943 B2
(45) Date of Patent: Apr. 27, 2021

(54) EXPANSION DEVICE, THREE-DIMENSIONAL IMAGE FORMING SYSTEM, THERMALLY-EXPANDABLE SHEET, THREE-DIMENSIONAL OBJECT SHAPING METHOD, AND COMPUTER-READABLE STORAGE MEDIUM

(71) Applicant: CASIO COMPUTER CO., LTD., Tokyo (JP)

(72) Inventors: Kouichi Numao, Fujimi (JP); Takao Semba, Hachioji (JP); Koji Tamura, Higashiyamato (JP); Junji Hobo, Hino (JP); Takayuki Fukushima, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 59 days.

(21) Appl. No.: 16/030,045

(22) Filed: Jul. 9, 2018

(65) Prior Publication Data
US 2019/0023026 A1    Jan. 24, 2019

(30) Foreign Application Priority Data

Jul. 18, 2017 (JP) .............................. JP2017-139306

(51) Int. Cl.
*B41J 3/407* (2006.01)
*B32B 5/18* (2006.01)

(52) U.S. Cl.
CPC ................. *B41J 3/407* (2013.01); *B32B 5/18* (2013.01)

(58) Field of Classification Search
CPC .................................. B41J 3/407; B32B 5/18
See application file for complete search history.

(56) References Cited

U.S. PATENT DOCUMENTS

| | | | |
|---|---|---|---|
| 2014/0110887 A1* | 4/2014 | Horiuchi | B41J 3/28 264/413 |
| 2018/0001565 A1* | 1/2018 | Hocker | G01N 23/223 |

FOREIGN PATENT DOCUMENTS

| | | | |
|---|---|---|---|
| JP | S6428660 A | | 1/1989 |
| JP | H0218081 A | * | 1/1990 |
| JP | H02018081 A | | 1/1990 |
| JP | H0930073 A | | 2/1997 |

(Continued)

OTHER PUBLICATIONS

Japanese Office Action dated Sep. 24, 2019 (and English translation thereof) issued in Japanese Patent Application No. 2017-139306.

*Primary Examiner* — Joseph S Del Sole
*Assistant Examiner* — Yung-Sheng M Tsui
(74) *Attorney, Agent, or Firm* — Holtz, Holtz & Volek PC

(57) ABSTRACT

An expansion device includes: a thermal distension unit configured to thermally distend a thermally-expandable sheet by irradiating the thermally-expandable sheet with predetermined energy; a reading unit configured to read identifiers provided at predetermined positions of the thermally-expandable sheet; and a setting unit configured to set an amount of energy per unit area to be emitted on the thermally-expandable sheet by the thermal distension unit depending on whether (i) a second identifier as well as a first identifier has been read, or (ii) whether a predetermined part of the first identifier has been read but another part has not been read, as a result of reading the identifiers by the reading unit.

13 Claims, 17 Drawing Sheets

(56) References Cited

FOREIGN PATENT DOCUMENTS

| | | | | |
|---|---|---|---|---|
| JP | H09193370 | A | * | 7/1997 |
| JP | 2000001002 | A | | 1/2000 |
| JP | 2001150812 | A | | 6/2001 |
| JP | 2006142532 | A | | 6/2006 |
| JP | 2013178353 | A | | 9/2013 |
| JP | 2013220647 | A | | 10/2013 |
| JP | 2015205403 | A | * | 11/2015 |
| JP | 2016179567 | A | * | 10/2016 |

* cited by examiner

FIG. 13

| | READING OF LOWER SIDE OF SHEET | READING OF UPPER SIDE OF SHEET | DETERMINATION RESULT |
|---|---|---|---|
| 1 | BARCODE B1 | BARCODE B2 | PEELING LAYER IS PRESENT, FRONT FACE IS UPPER SIDE |
| 2 | BARCODE B2 | NONE | PEELING LAYER IS ABSENT, FRONT FACE IS UPPER SIDE |
| 3 | BARCODE B2 | BARCODE B1 | PEELING LAYER IS PRESENT, BACK FACE IS UPPER SIDE (ERRONEOUS PLACEMENT OF SHEET) |
| 4 | NONE | | PEELING LAYER IS ABSENT, BACK FACE IS UPPER SIDE |
| 5 | OTHERS | | SHEET OTHER THAN DEDICATED SHEET IS PLACED |

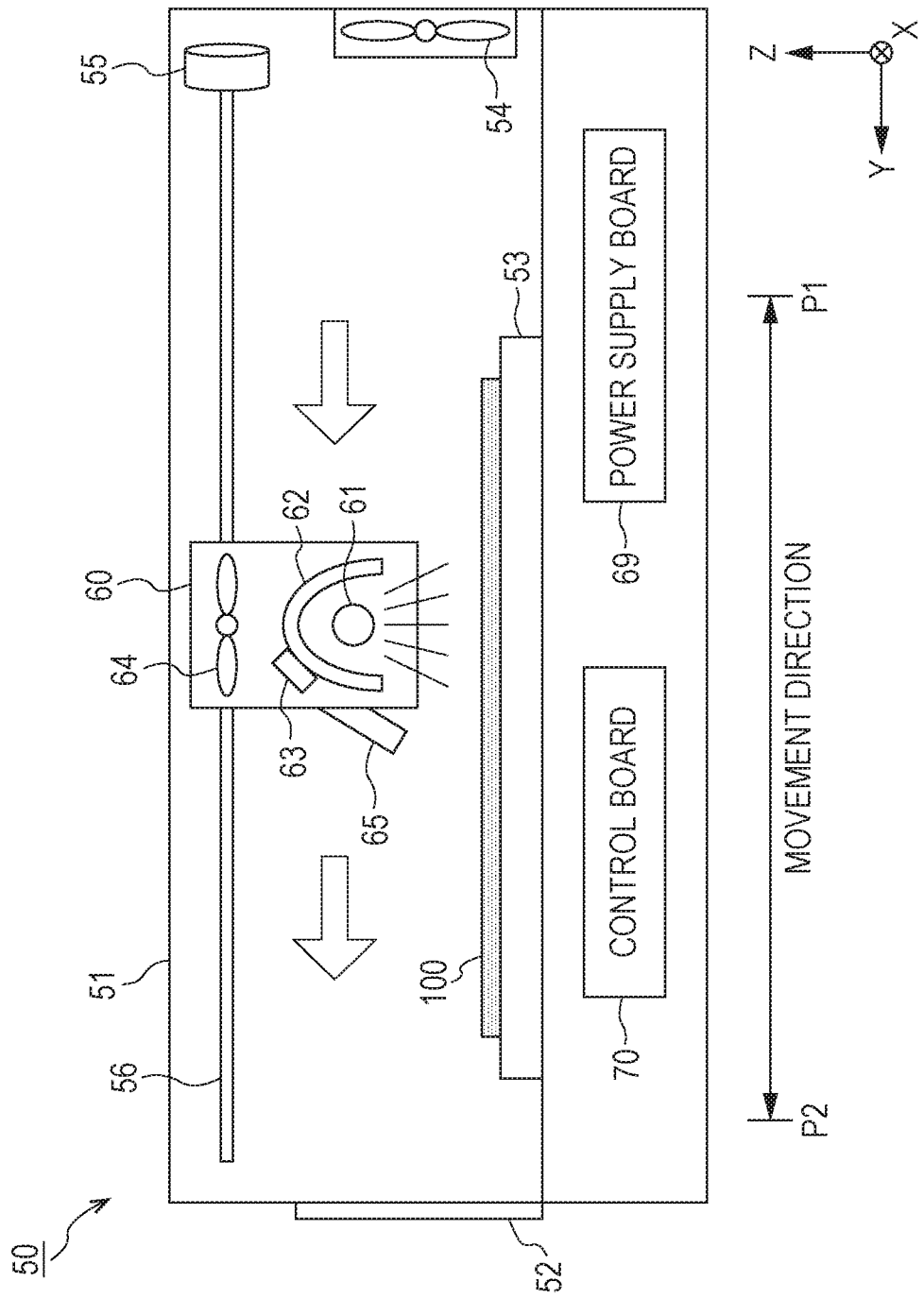

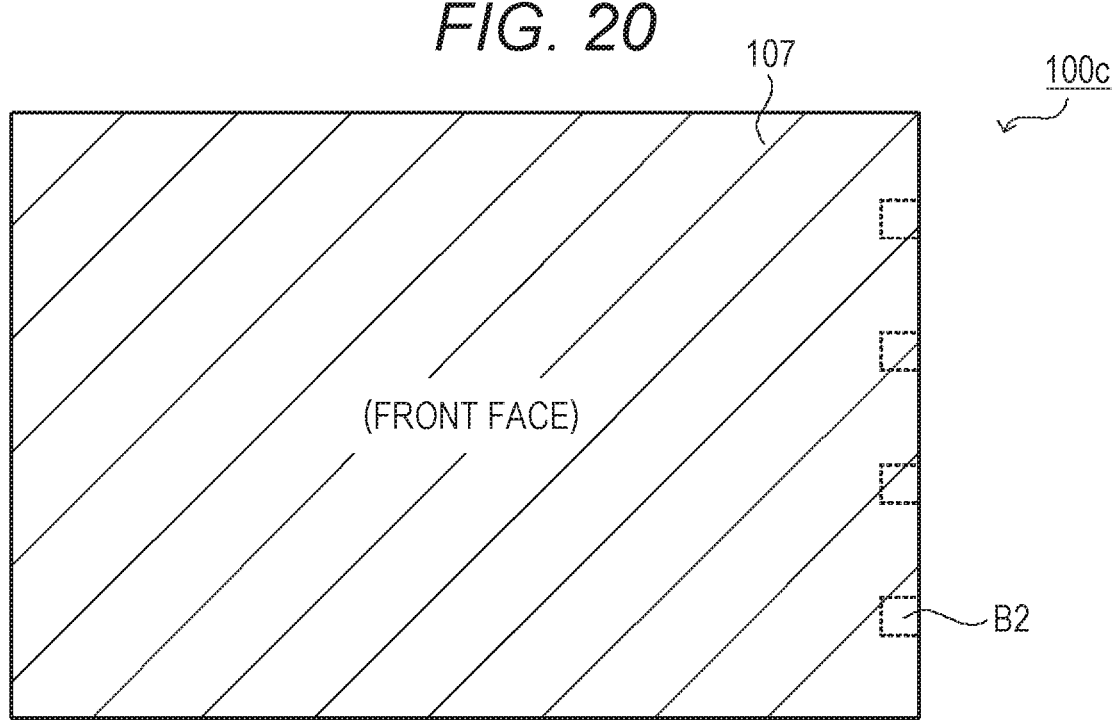
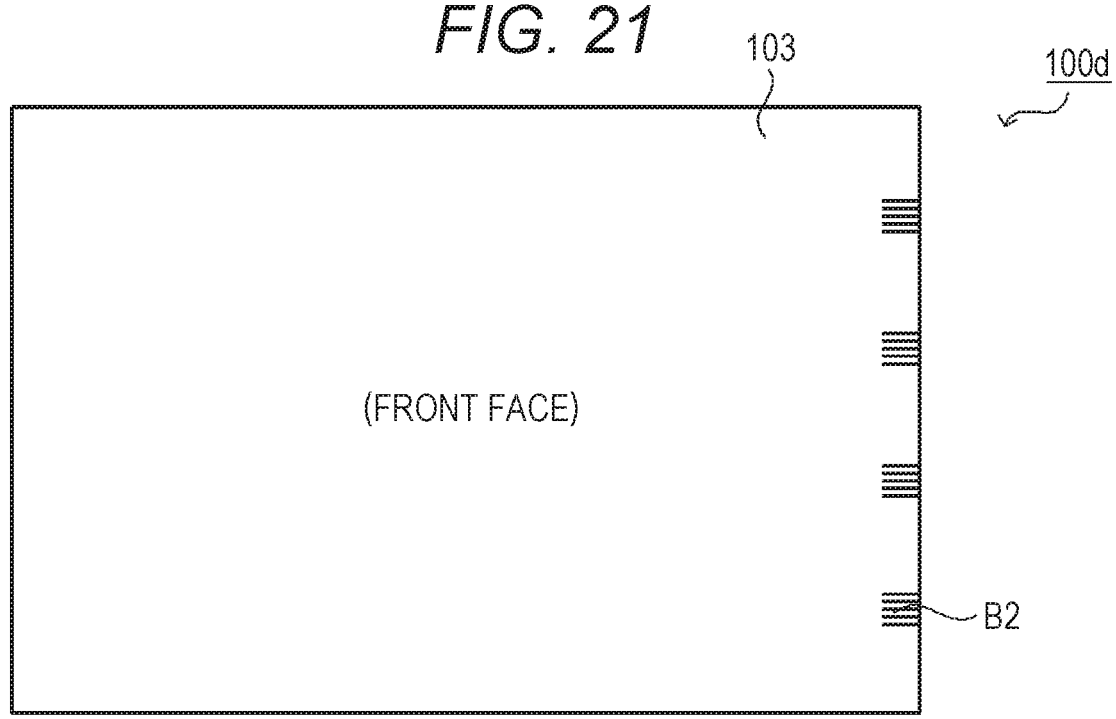

FIG. 22

| | READING OF LOWER SIDE OF SHEET | READING OF UPPER SIDE OF SHEET | DETERMINATION RESULT |
|---|---|---|---|
| 1 | BARCODE B1 | BARCODE B2 | PEELING LAYER IS ABSENT, FRONT FACE IS UPPER SIDE |
| 2 | BARCODE B1 | NONE | PEELING LAYER IS PRESENT, FRONT FACE IS UPPER SIDE |
| 3 | BARCODE B2 | BARCODE B1 | PEELING LAYER IS ABSENT, BACK FACE IS UPPER SIDE |
| 4 | NONE | | PEELING LAYER IS PRESENT, BACK FACE IS UPPER SIDE (ERRONEOUS PLACEMENT OF SHEET) |
| 5 | OTHERS | | SHEET OTHER THAN DEDICATED SHEET IS PLACED |

EXPANSION DEVICE,
THREE-DIMENSIONAL IMAGE FORMING
SYSTEM, THERMALLY-EXPANDABLE
SHEET, THREE-DIMENSIONAL OBJECT
SHAPING METHOD, AND
COMPUTER-READABLE STORAGE
MEDIUM

BACKGROUND OF THE INVENTION

1. Field of the Invention

The present invention relates to an expansion device, a three-dimensional image forming system, a thermally-expandable sheet, a three-dimensional object shaping method, and a computer-readable storage medium.

2. Description of the Related Art

Techniques for forming a three-dimensional image have been known. For example, patent literatures such as JP S64-28660 A and JP 2001-150812 A disclose methods for forming a three-dimensional image using a thermally-expandable sheet. Specifically, a pattern is formed using a material having excellent light absorption properties on a back face of the thermally-expandable sheet, and the formed pattern is heated by irradiating the pattern with light using an irradiation unit in the methods disclosed in the above-described patent literatures. Accordingly, a portion of the thermally-expandable sheet on which the pattern has been formed distends and swells to form a three-dimensional image.

In addition, JP 2013-220647 A discloses a method for forming a three-dimensional image using a thermally-expandable sheet to which an adhesive seal that is a peelable peeling layer has been affixed. In the method disclosed in JP 2013-220647 A, a pattern is formed on the adhesive seal with a material that converts light into heat, a portion of the thermally-expandable sheet where the pattern has been formed is selectively distended, and then, the adhesive seal is peeled off. Accordingly, the pattern formed of the material that converts light into heat is removed, so that it is possible to effectively utilize a surface to which the adhesive seal has been affixed.

A way of heat transfer differs depending on the presence or absence of the peeling layer between the thermally-expandable sheet that has the peeling layer and the thermally-expandable sheet that does not have the peeling layer as described above. Thus, there is a problem that a difference is caused in the degree of expansion depending on whether the thermally-expandable sheet is provided with the peeling layer, and the extension with high precision is difficult.

SUMMARY OF THE INVENTION

An expansion device includes: a thermal distension unit configured to thermally distend a thermally-expandable sheet by irradiating the thermally-expandable sheet with predetermined energy; a reading unit configured to read identifiers provided at predetermined positions of the thermally-expandable sheet; and a setting unit configured to set an amount of energy per unit area to be emitted on the thermally-expandable sheet by the thermal distension unit depending on whether (i) a second identifier as well as a first identifier has been read, or (ii) whether a predetermined part of the first identifier has been read but another part has not been read, as a result of reading the identifiers by the reading unit.

An expansion device includes: an irradiation unit configured to irradiate a thermally-expandable sheet with an electromagnetic wave; a moving unit configured to relatively move the thermally-expandable sheet and the irradiation unit; a reading unit configured to read identifiers provided at predetermined positions of the thermally-expandable sheet; a setting unit configured to set a condition to distend the thermally-expandable sheet depending on whether (i) a second identifier as well as a first identifier has been read, or (ii) whether a predetermined part of the first identifier has been read but another part has not been read, as a result of reading the identifiers by the reading unit; and a distension processing unit configured to distend the thermally-expandable sheet by causing the irradiation unit to emit the electromagnetic wave while relatively moving the thermally-expandable sheet and the irradiation unit by the moving unit based on the condition set by the setting unit.

A thermally-expandable sheet includes: a thermally-distensible layer configured to distend by heating in a three-dimensional image forming system; a peelable peeling layer stacked on the thermally-distensible layer; and an identifier configured to be read in the three-dimensional image forming system, wherein a part of the identifier is provided on a front face of the peeling layer or at a position covered with a light-shielding layer provided on the peeling layer.

A three-dimensional object shaping method includes: a reading step of reading identifiers provided at predetermined positions of a thermally-expandable sheet; a setting step of setting an amount of energy per unit area to be emitted on the thermally-expandable sheet depending on whether a second identifier as well as a first identifier has been read, or whether a predetermined part of the first identifier has been read but another part has not been read, as a result of reading the identifiers in the reading step; and a thermal distension step of thermally distending the thermally-expandable sheet by irradiating the thermally-expandable sheet with energy having the amount of energy set in the setting step.

A three-dimensional object shaping method includes: a reading step of reading identifiers provided at predetermined positions of a thermally-expandable sheet; a setting step of setting a condition to distend the thermally-expandable sheet depending on whether a second identifier as well as a first identifier has been read, or whether a predetermined part of the first identifier has been read but another part has not been read, as a result of reading the identifiers in the reading step; and a thermal distension step of thermally distending the thermally-expandable sheet by causing an irradiator to emit an electromagnetic wave while relatively moving the thermally-expandable sheet and the irradiator based on the condition set in the setting step.

A computer-readable storage medium for controlling an expansion device includes a control unit, and causes a computer to perform following processes: a process of thermally distending a thermally-expandable sheet by irradiating the thermally-expandable sheet with predetermined energy; a process of reading identifiers provided at predetermined positions of the thermally-expandable sheet; and a process of setting an amount of energy per unit area to be emitted on the thermally-expandable sheet by the thermally-distending process depending on whether (i) a second identifier has been read as well as a first identifier, or (ii) whether a predetermined part of the first identifier has been read but another part has not been read, as a result of reading the identifiers.

A computer-readable storage medium for controlling an expansion device includes a control unit, and causes a computer to perform following processes: a process of relatively moving a thermally-expandable sheet and an irradiator configured to irradiate the thermally-expandable sheet with an electromagnetic wave; a process of reading identifiers provided at predetermined positions of the thermally-expandable sheet; a process of setting a condition to distend the thermally-expandable sheet depending on whether (i) a second identifier has been read as well as a first identifier, or (ii) whether a predetermined part of the first identifier has been read but another part has not been read, as a result of reading the identifiers; and a process of distending the thermally-expandable sheet by causing the irradiator to emit the electromagnetic wave while relatively moving the thermally-expandable sheet and the irradiator by the moving process based on the set condition.

BRIEF DESCRIPTION OF DRAWINGS

FIG. 13 is a table showing a correspondence relationship between a result of reading the barcode and a type and an orientation of a thermally-expandable sheet in the first embodiment;

FIG. 14 is a diagram illustrating a state where the expansion device according to the first embodiment executes a distension process;

FIG. 20 is a view illustrating a front face of a first thermally-expandable sheet according to a second embodiment of the invention;

FIG. 21 is a view illustrating a front face of a second thermally-expandable sheet according to the second embodiment;

FIG. 22 is a table showing a correspondence relationship between a result of reading a barcode and a type and an orientation of a thermally-expandable sheet in the second embodiment.

DETAILED DESCRIPTION

Figure 1:
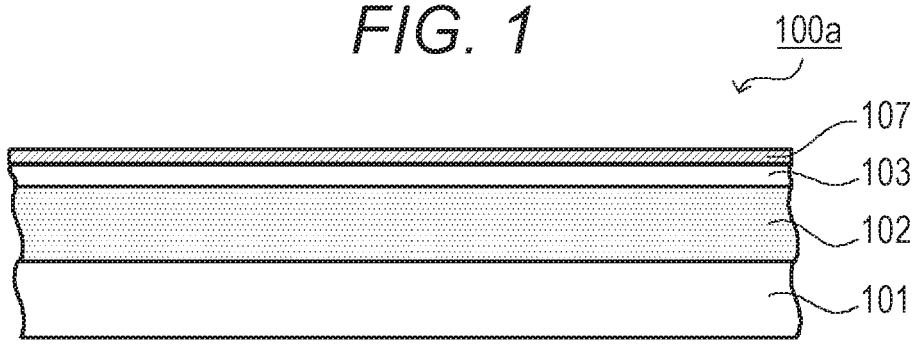
FIG. 1 is a cross-sectional view of a first thermally-expandable sheet according to a first embodiment of the invention.

Hereinafter, embodiments of the invention will be described with reference to the drawings. In the drawings, the same or corresponding parts will be denoted by the same reference numerals.

First Embodiment

<Thermally-Expandable Sheets 100a and 100b>

FIG. 1 illustrates a configuration of a thermally-expandable sheet 100a which is a first thermally-expandable sheet to form a three-dimensional image by a three-dimensional image forming system 1 according to a first embodiment. The thermally-expandable sheet 100a is a medium on which a three-dimensional image is formed by distending a portion that has been selected in advance by heating. The three-dimensional image is an image having a three-dimensional spread that is formed as a part of a sheet is distended in a direction perpendicular to the sheet in the two-dimensional sheet. A three-dimensional image is also referred as a three-dimensional object or a shaped object, and has a simple shape, a geometric shape, a general shape such as a letter.

Figure 2:
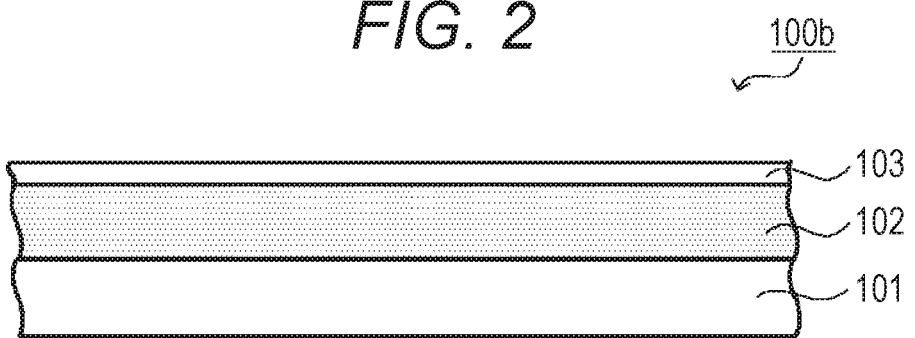
FIG. 2 is a cross-sectional view of a second thermally-expandable sheet according to the first embodiment.

As illustrated in FIG. 1, the thermally-expandable sheet 100a includes a base member 101, the thermally-distensible layer 102, an ink-receiving layer 103, and a peeling layer 107 in this order. Incidentally, FIGS. 1 and 2 illustrates a cross section of the thermally-expandable sheet 100a before a three-dimensional image is formed, that is, a state where no part is distended.

The base member 101 is a sheet-like medium that serves as a base of the thermally-expandable sheet 100a. The base member 101 is a support that supports the thermally-distensible layer 102 and the ink-receiving layer 103, and plays a role of maintaining the strength of the thermally-expandable sheet 100a. For example, general printing paper can be used as the base member 101. Alternatively, a material of the base member 101 may be a plastic film such as synthetic paper, cloth such as canvas, polypropylene, polyethylene terephthalate (PET), and polybutylene terephthalate (PBT), and is not particularly limited.

The thermally-distensible layer 102 is a layer that is stacked on the upper side of the base member 101 and distends when heated to a temperature to a prescribed temperature or higher. The thermally-distensible layer 102 contains a binder and thermal-expandable agents dispersed in the binder. The binder is a thermoplastic resin such as a vinyl acetate type polymer and an acryl type polymer. To be specific, the thermal-expandable agent is a thermally-expandable microcapsule (micropowder) having a particle size of about 5 to 50 μm obtained by encapsulating a substance to be vaporized at a low boiling point such as propane and butane in a shell of a thermoplastic resin. When the thermal-expandable agent is heated to a temperature of, for example, 80° C. to 120° C., the encapsulated substance is vaporized to foam and distend due to the pressure. In this manner, the thermally-distensible layer 102 distends depending on the amount of heat thus absorbed. The thermal-expandable agent is also referred to as a foaming agent.

The ink-receiving layer 103 is a layer that is stacked on the upper side of the thermally-distensible layer 102 and absorbs and receives the ink. The ink-receiving layer 103 receives a printing ink used in an ink jet printer, a printing toner used in a laser printer, an ink of a ball-point pen or a fountain pen ink, graphite of a pencil, and the like. The ink-receiving layer 103 is formed using a material suitable for fixing such inks on a front face. For example, a general-purpose material used for inkjet paper can be used as the material of the ink-receiving layer 103.

The peeling layer 107 is a layer that is stacked on an upper side of the ink-receiving layer 103 so as to be peelable. The peeling layer 107 is a resin film and peelably adheres to the ink-receiving layer 103. As the resin, a generally used material such as an ethylene-vinyl alcohol copolymer can be arbitrarily used. The peeling layer 107 can also be referred to as a laminate layer, a peeling film, or the like.

FIG. 2 illustrates a configuration of a thermally-expandable sheet 100b which is a second thermally-expandable sheet to form a three-dimensional image by the three-dimensional image forming system 1 according to the first embodiment. The thermally-expandable sheet 100b is a medium on which a three-dimensional image is formed by distending a portion that has been selected in advance by heating, which is similar to the thermally-expandable sheet 100a.

As illustrated in FIG. 2, the thermally-expandable sheet 100b includes the base member 101, the thermally-distensible layer 102, and the ink-receiving layer 103 in this order. Each of the base member 101, the thermally-distensible layer 102, and the ink-receiving layer 103 is the same as that in the thermally-expandable sheet 100a. In other words, the thermally-expandable sheet 100b has no peeling layer 107 differently from the thermally-expandable sheet 100a, but the other configurations thereof are the same as those of the thermally-expandable sheet 100a.

Figure 3:
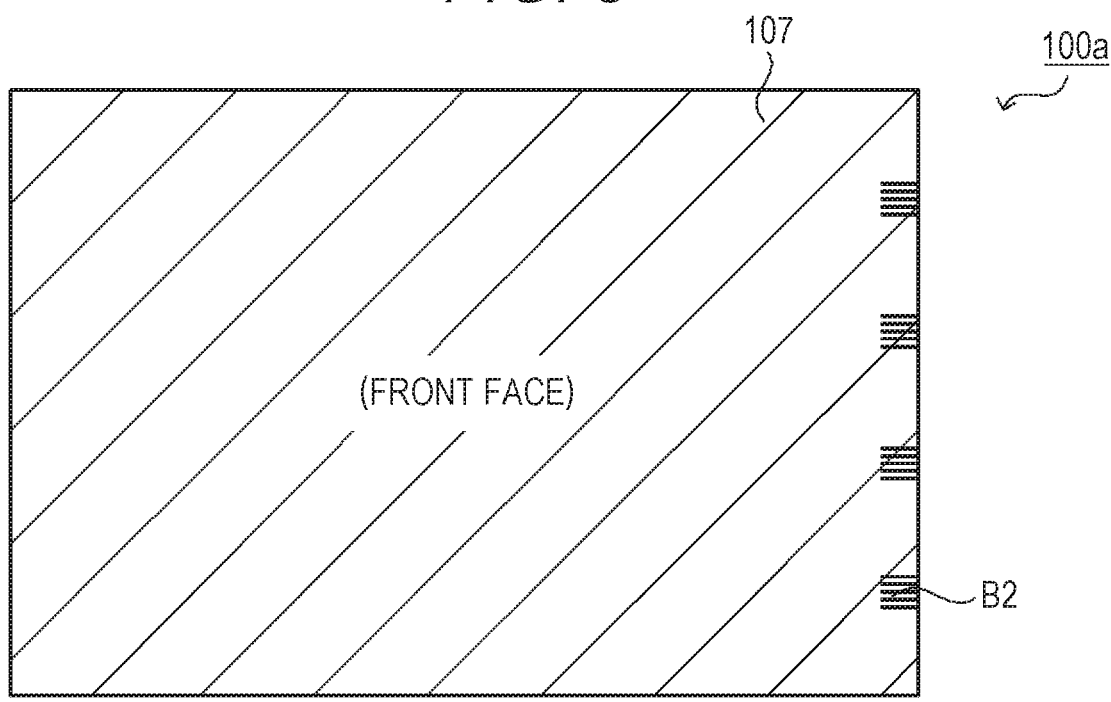
FIG. 3 is a view illustrating a front face of the first thermally-expandable sheet illustrated in FIG. 1.

FIG. 3 illustrates the front face of the thermally-expandable sheet 100a. The front face of the thermally-expandable sheet 100a corresponds to a front face of the peeling layer 107. Incidentally, the front face of the peeling layer 107 is hatched in FIG. 3 in order to facilitate understanding.

As illustrated in FIG. 3, a plurality of barcodes B2 are attached to the front face of the thermally-expandable sheet 100a along an edge portion thereof. The barcode B2 is a second identifier configured to identify the thermally-expandable sheet 100a and is the identifier indicating the presence or absence of the peeling layer 107. The presence or absence of the peeling layer 107 means whether the thermally-expandable sheet 100a has the peeling layer 107. The barcode B2 is read by an expansion device 50 to be described later and is used to determine the presence or absence of the peeling layer 107.

Figure 4:
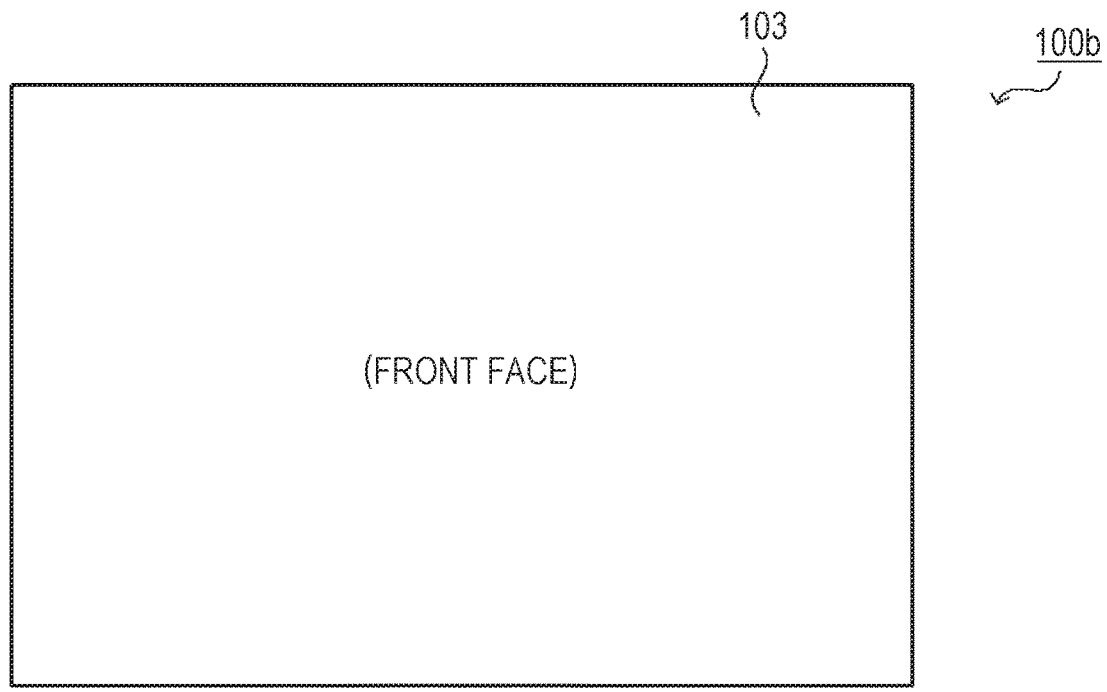
FIG. 4 is a view illustrating a front face of the second thermally-expandable sheet illustrated in FIG. 2.

FIG. 4 illustrates a front face of the thermally-expandable sheet 100b. The front face of the thermally-expandable sheet 100b corresponds to a front face of the ink-receiving layer 103.

As illustrated in FIG. 4, the barcode B2 is not attached to the front face of the thermally-expandable sheet 100b, which is different from the thermally-expandable sheet 100a. In other words, the thermally-expandable sheet 100b that does not include the peeling layer 107 is not provided with an identifier indicating the presence or absence of the peeling layer 107. It is possible to identify whether the thermally-expandable sheet 100 is the thermally-expandable sheet 100a including the peeling layer 107 or the thermally-expandable sheet 100b not including the peeling layer 107 depending on whether the barcode B2 is attached to the front face in this manner.

Figure 5:
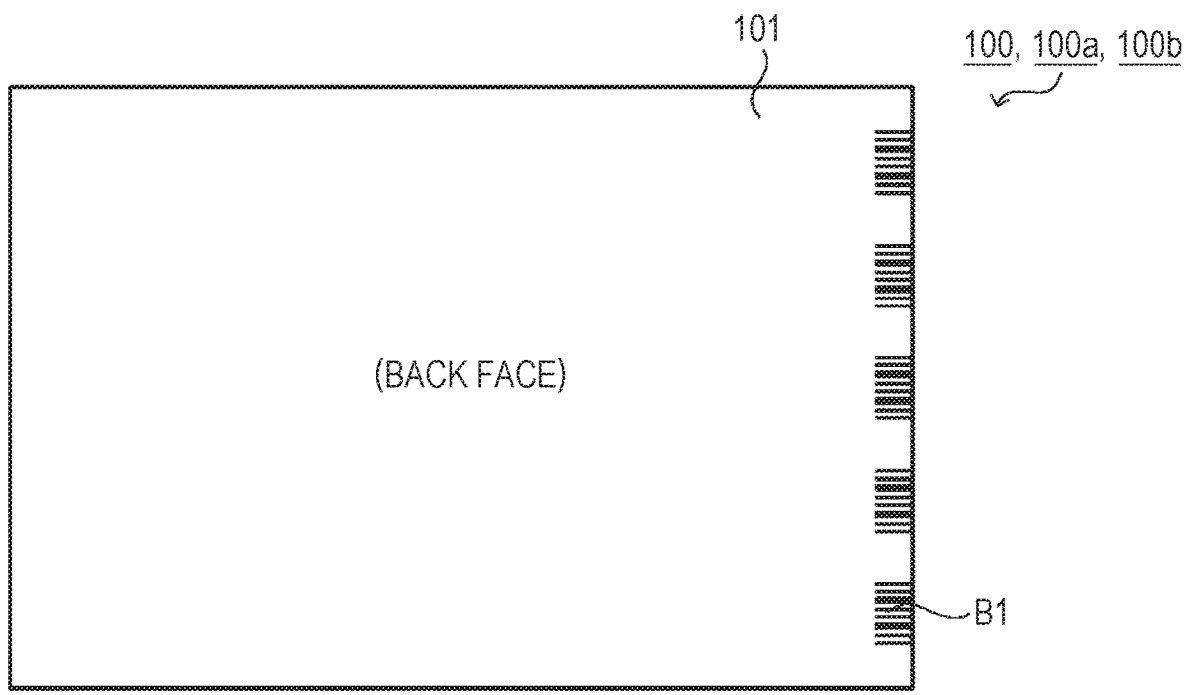
FIG. 5 is a view illustrating a back face of the first and second thermally-expandable sheet illustrated in FIGS. 1 and 2.

FIG. 5 illustrates a back face of the thermally-expandable sheets 100a and 100b. Each back face of the thermally-expandable sheets 100a and 100b is each face of the thermally-expandable sheets 100a and 100b on a side of the base member 101, and corresponds to a back face of the base member 101. The back face of the thermally-expandable sheet 100a is a face opposite to a side on which the peeling layer 107 is provided.

As illustrated in FIG. 5, a plurality of barcodes B1 are attached to the back face of the thermally-expandable sheet 100a and the back face of the thermally-expandable sheet 100b along an edge portion thereof. The barcode B1 is a first identifier configured to identify the thermally-expandable sheets 100a and 100b, and is the identifier indicating that the thermally-expandable sheets 100a and 100b are dedicated sheets to form a three-dimensional image. The barcode B1 is provided on an edge portion of the thermally-expandable sheet 100a on the same side as the side where the barcode B2 is attached. The barcode B1 is read by the expansion device 50 similarly to the barcode B2, and is used to determine whether to use the thermally-expandable sheets 100a and 100b in the expansion device 50. Incidentally, the two barcodes B1 and B2 (first and second identifiers) are collectively referred to simply as an "identifier". It is possible to say that each of the barcodes B1 and B2 is a part of the identifier provided in the thermally-expandable sheet 100a.

The three-dimensional image forming system 1 according to the first embodiment can form a three-dimensional image on the above-described two types of the thermally-expandable sheets 100a and 100b. The user can purchase the thermally-expandable sheet 100b as a sheet in the state of not including the peeling layer 107, or can obtain the thermally-expandable sheet 100b by peeling off the peeling layer 107 of the thermally-expandable sheet 100a. In the following description, the thermally-expandable sheet 100a and the thermally-expandable sheet 100b will be collectively referred to as the thermally-expandable sheet 100 when being referred to without discrimination.

Carbon molecules are printed on a portion of the front or back face of the thermally-expandable sheet 100 that is desirably to be distended. The carbon molecule is a type of electromagnetic wave-heat conversion material (exothermic agent) that is contained in an ink of black (carbon black) or another color and absorbs electromagnetic waves and converts the electromagnetic waves into heat. The carbon molecules absorb the electromagnetic waves and thermally vibrate, thereby generating heat. When the portion on which the carbon molecules have been printed is heated in the thermally-expandable sheet 100, the thermally-distensible layer 102 of the portion distends to form a bulge (bump). A three-dimensional image (a three-dimensional object or a shaped object) is formed on the thermally-expandable sheet 100 by forming a convex or concavo-convex shape using such a bulge (bump) of the thermally-distensible layer 102.

A shaped object is represented on a front face of a thermally-expandable sheet 100 by bulges of a thermally-distensible layer 102. Further, the "shaped object" in the present specification includes a wide range of shapes such as simple shapes, geometric shapes, characters, and decorations. Here, the decorations mean shapes that recall an esthetic impression through a sense of sight and/or a sense of touch. Further, "shaping (or molding)" also includes concepts such as addition of decorations and formation of decorations without being limited to simple formation of the shaped object. Further, a decorative shaped object indicates a shaped object which is formed as a result of the addition of decorations or the formation of decorations.

The shaped object according to the present embodiments uses as a reference a particular two-dimensional face (for example, an XY plane) within a three-dimensional space, and includes unevenness (for example, a Z axis) perpendicular to the face. Such shaped object is one example of three-dimensional (3D) images, but so as to distinguish from a three-dimensional image manufactured using a so-called 3D printing technique, the shaped object is called a 2.5-dimensional (2.5D) image or a pseudo-three-dimensional (preudo-3D) image. Furthermore, the technique for manufacturing the shaped object is one example of three-dimensional image printing techniques, but so as to distinguish from a so-called 3D printer, the technique is called a 2.5-dimensional (2.5D) printing technique or a pseudo-three-dimensional (pseudo-3D) printing technique.

<Three-Dimensional Image Forming System (Three-Dimensional Object Shaping System) 1>

Figure 6:
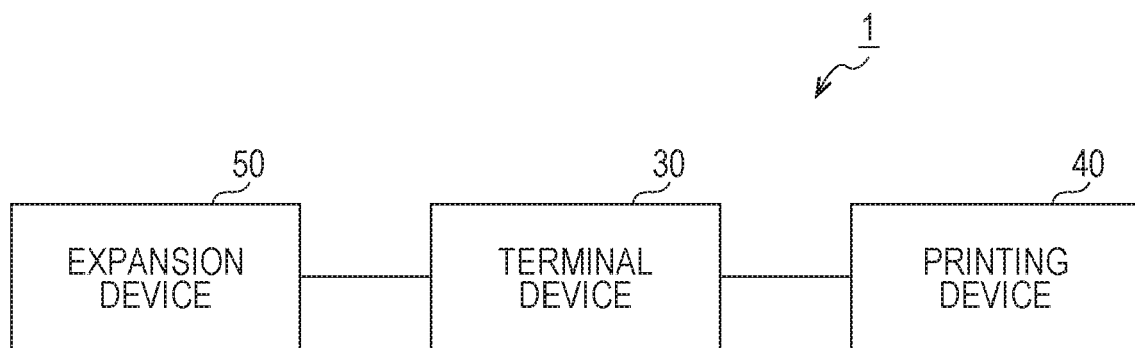
FIG. 6 is a diagram illustrating a schematic configuration of a three-dimensional image forming system according to the first embodiment.

Next, the three-dimensional image forming system 1 configured to form a three-dimensional image on the thermally-expandable sheet 100 will be described with reference to FIG. 6. As illustrated in FIG. 6, the three-dimensional image forming system 1 includes a terminal device 30, a printing device 40, and the expansion device 50.

Figure 7:
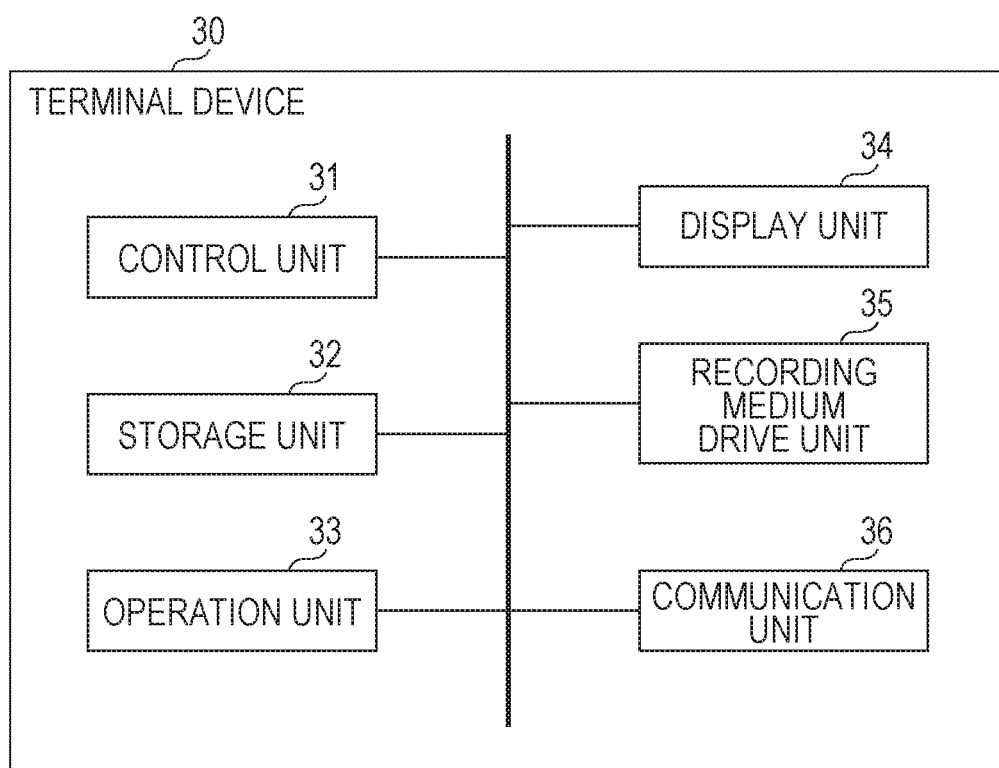
FIG. 7 is a block diagram illustrating a configuration of a terminal device according to the first embodiment.

The terminal device 30 is an information processing device such as a personal computer, a smartphone, and a tablet, and is a control unit that controls the printing device 40 and the expansion device 50. As illustrated in FIG. 7, the terminal device 30 includes a control unit 31, a storage unit 32, an operation unit 33, a display unit 34, a recording medium drive unit 35, and a communication unit 36. These units are connected via a bus configured to transmit a signal.

The control unit 31 includes a central processing unit (CPU), read only memory (ROM), and random access memory (RAM). In the control unit 31, the CPU reads a control program stored in the ROM and controls the entire operation of the terminal device 30 while using the RAM as a work memory.

The storage unit 32 is nonvolatile memory such as flash memory and a hard disk. The storage unit 32 stores a program or data executed by the control unit 31, and color image data, front face foaming data, and back face foaming data to be printed by the printing device 40.

The operation unit 33 includes an input device such as a keyboard, a mouse, a button, a touch pad, and a touch panel, and receives an operation from a user. The user can input an operation of editing the color image data, the front face foaming data, and the back face foaming data, an operation with respect to the printing device 40 or the expansion device 50, and the like by operating the operation unit 33.

The display unit 34 includes a display device such as a liquid crystal display and an organic electro luminescence (EL) display, and a display drive circuit that displays an image on the display device. For example, the display unit 34 displays the color image data, front face foaming data, and backside foaming data. Further, the display unit 34 displays information indicating a current state of the printing device 40 or the expansion device 50 as necessary.

The recording medium drive unit 35 reads a program or data recorded in a portable recording medium. The portable recording medium is a compact disc (CD)-ROM, a digital versatile disc (DVD)-ROM, flash memory provided with a universal serial bus (USB) standard connector, or the like. For example, the recording medium drive unit 35 reads and acquires the color image data, the front face foaming data, and the back face foaming data from the portable recording medium.

The communication unit 36 includes an interface configured to communicate with external devices including the printing device 40 and the expansion device 50. The terminal device 30 is connected to the printing device 40 and the expansion device 50 in a wired manner via a flexible cable, a wired local area network (LAN), and the like or a wireless manner via a wireless LAN, Bluetooth (registered trademark), and the like. The communication unit 36 communicates with the printing device 40 and the expansion device 50 according to at least one of such communication standards under the control of the control unit 31.

<Printing Device 40>

The printing device 40 is a printing unit that prints an image on the front or back face of the thermally-expandable sheet 100. The printing device 40 is an inkjet printer that prints an image by a method for converting ink into fine droplets and blowing the ink droplets directly onto a printing medium.

Figure 8:
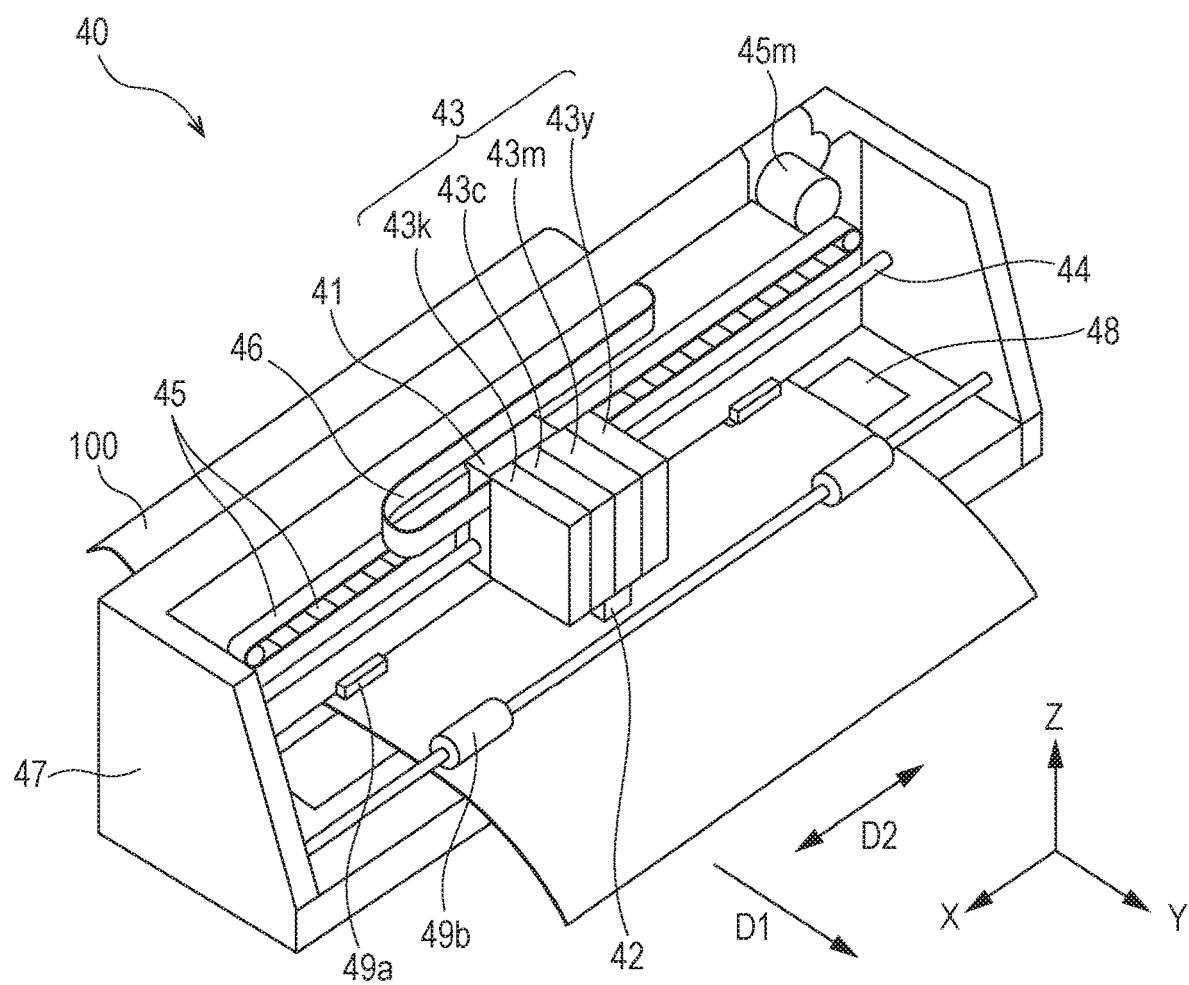
FIG. 8 is a perspective view illustrating a configuration of a printing device according to the first embodiment.

FIG. 8 illustrates a detailed configuration of the printing device 40. As illustrated in FIG. 8, the printing device 40 includes a carriage 41 capable of reciprocating in a main scanning direction D2 (X direction) orthogonal to a sub-scanning direction D1 (Y direction) in which the thermally-expandable sheet 100 is conveyed.

A print head 42 that performs printing and ink cartridges 43 (43k, 43c, 43m, and 43y) that contain inks are attached to the carriage 41. Color inks of black K, cyan C, magenta M, and yellow Y are contained in the ink cartridges 43k, 43c, 43m, and 43y, respectively. Each color ink is ejected from a corresponding nozzle of the print head 42.

The carriage 41 is slidably supported on a guide rail 44, and is clamped by a drive belt 45. When the drive belt 45 is driven by rotation of a motor 45m, the carriage 41 moves in the main scanning direction D2 together with the print head 42 and the ink cartridge 43.

A platen 48 is provided at a position opposing the print head 42 in a lower part of a frame 47. The platen 48 extends in the main scanning direction D2 and forms a part of a conveying path of the thermally-expandable sheet 100. A sheet-feeding roller pair 49a (a lower roller thereof is not illustrated) and a sheet-discharging roller pair 49b (a lower roller thereof is not illustrated) are provided in the conveying path of the thermally-expandable sheet 100. The sheet-feeding roller pair 49a and the sheet-discharging roller pair 49b convey the thermally-expandable sheet 100 supported by the platen 48 in the sub-scanning direction D1.

The printing device 40 is connected to the terminal device 30 via a flexible communication cable 46. The terminal device 30 controls the print head 42, the motor 45m, the sheet-feeding roller pair 49a, and the sheet-discharging roller pair 49b via the flexible communication cable 46. More specifically, the terminal device 30 controls the sheet-feeding roller pair 49a and the sheet-discharging roller pair 49b to convey the thermally-expandable sheet 100. Further, the terminal device 30 rotates the motor 45m to move the carriage 41 and to convey the print head 42 to an appropriate position in the main scanning direction D2.

The printing device 40 acquires image data from the terminal device 30 and executes printing based on the acquired image data. More specifically, the printing device 40 acquires the color image data, the front face foaming data, and the back face foaming data as the image data. The color image data is data indicating a color image to be printed on the front face of the thermally-expandable sheet 100. The printing device 40 causes the print head 42 to spray each ink of cyan C, magenta M, and yellow Y toward the thermally-expandable sheet 100 to print the color image.

The front face foaming data is data indicating a portion that is caused to foam and distend on the front face of the thermally-expandable sheet 100. Further, the back face foaming data is data indicating a portion that is caused to foam and distend on the back face of the thermally-expandable sheet 100. The printing device 40 causes the print head 42 to spray the black ink of black K containing carbon black toward the thermally-expandable sheet 100 to print a grayscale image (grayscale pattern) using the black color. The black ink containing carbon black is an example of a material that converts electromagnetic waves into heat.

<Expansion Device 50>

The expansion device 50 is an expansion unit that irradiates the front or back face of the thermally-expandable sheet 100 with an electromagnetic wave, causes a grayscale image printed on the front or back face of the thermally-expandable sheet 100 to generate heat, and causes a portion of the thermally-expandable sheet 100 on which the grayscale image has been printed to be distended.

Figure 9:
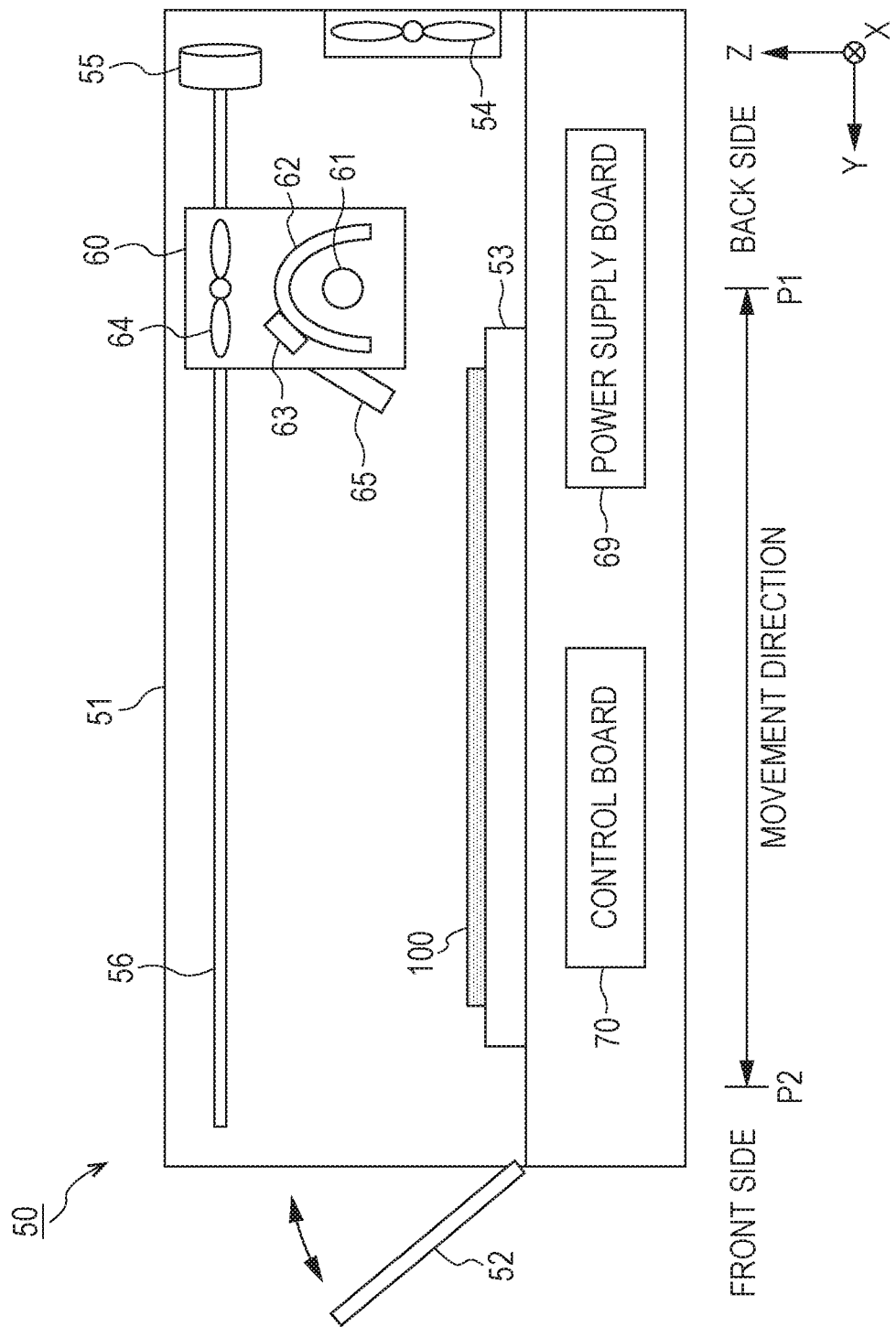
FIG. 9 is a cross-sectional view illustrating a configuration of an expansion device according to the first embodiment.

FIG. 9 schematically illustrates a configuration of the expansion device 50. In FIG. 9, the X direction corresponds to the width direction of the expansion device 50, the Y direction corresponds to the longitudinal direction of the expansion device 50, and the Z direction corresponds to the vertical direction. The X direction, the Y direction, and the Z direction are orthogonal to each other. As illustrated in FIG. 9, the expansion device 50 includes a housing 51, an insertion section 52, a tray 53, a ventilation unit 54, a conveyance motor 55, a conveyance rail 56, an irradiator 60, a power supply board 69, and a control board 70.

The insertion section 52 is a mechanism that is provided with an openable and closable door and is configured to insert the thermally-expandable sheet 100, which is a target for forming a three-dimensional image, inside the housing 51. A user opens the insertion section 52, causes the tray 53 to slide and be pulled out to the front side, and then, places the thermally-expandable sheet 100 on the tray 53 with the front or back face thereof facing upward. At this time, the user places the thermally-expandable sheet 100 on the tray 53 such that an end portion of the thermally-expandable sheet 100 to which the barcode B1 is attached is positioned on the back side. When the tray 53 on which the thermally-expandable sheet 100 is placed is returned to the inside of the housing 51 and the insertion section 52 is closed, the thermally-expandable sheet 100 is arranged at a position that can be irradiated with electromagnetic waves by the irradiator 60.

The tray 53 is a mechanism configured to place the thermally-expandable sheet 100 at an appropriate position in the housing 51. The tray 53 is fixed by pressing edges of four sides of the placed thermally-expandable sheet 100 from above. The tray 53 is provided with a sensor that detects the thermally-expandable sheet 100, and detects whether the thermally-expandable sheet 100 has been placed and a size of the thermally-expandable sheet 100 when the thermally-expandable sheet 100 has been placed.

The ventilation unit 54 is provided at an end portion on the back side in the expansion device 50 and functions as a ventilation unit that ventilates the inside of the expansion device 50. The ventilation unit 54 is provided with at least one fan, and ventilates the inside of the housing 51 by discharging the air inside the housing 51 to the outside. The air in the housing 51 is supplied from the outside by the air-blowing unit 64 and discharged to the outside by the ventilation unit 54. The ventilation unit 54 circulates the air inside the housing 51 by discharging the air supplied from the outside by the air-blowing unit 64 to the outside.

The conveyance motor 55 is, for example, a stepping motor that operates in synchronization with pulse power, and moves the irradiator 60 along the front or back face of the thermally-expandable sheet 100. The conveyance rail 56 is provided inside of the housing 51 in the Y direction, that is, in a direction parallel to the front or back face of the thermally-expandable sheet 100. The irradiator 60 is attached to the conveyance rail 56 so as to be movable along the conveyance rail 56. The irradiator 60 reciprocates along the conveyance rail 56 while keeping a constant distance from the thermally-expandable sheet 100 by using a driving force resulting from the rotation of the conveyance motor 55 as a power source. The conveyance motor 55 functions as a moving unit configured to relatively moving the thermally-expandable sheet 100 and the irradiator 60.

More specifically, the irradiator 60 reciprocates between a first position P1 corresponding to the end portion on the back side of the thermally-expandable sheet 100 and a second position P2 corresponding to an end portion on the front side of the thermally-expandable sheet 100. The conveyance motor 55 moves the irradiator 60 in a first direction from the first position P1 to the second position P2 and in a second direction from the second position P2 toward the first position P1. The first position P1 is an initial position (home position) of the irradiator 60. The irradiator 60 stands by at the first position P1 while the expansion device 50 does not operate.

The first position P1 is a position on the opposite side of a side where the insertion section 52 is provided in the housing 51, and the second position P2 is a position on a side where the insertion section 52 is provided in the housing 51. Since the initial position of the irradiator 60 is provided on the side opposite to the insertion section 52 in the housing 51 in this manner, the user can smoothly place the thermally-expandable sheet 100 inside the housing 51.

The irradiator 60 is a mechanism that emits an electromagnetic wave, and irradiates the thermally-expandable sheet 100 arranged on the tray 53 with the electromagnetic waves. As illustrated in FIG. 9, the irradiator 60 includes a lamp heater 61, a reflection plate 62, a temperature sensor 63, an air-blowing unit 64, and a barcode reader 65.

The lamp heater 61 includes, for example, a halogen lamp as an irradiation source and irradiates the thermally-expandable sheet 100 with light, as electromagnetic waves, of a near-infrared region (having a wavelength of 750 to 1400 nm), a visible light region (having a wavelength of 380 to 750 nm), or a mid-infrared region (having a wavelength of 1400 to 4000 nm). The irradiator 60 and the lamp heater 61 function as irradiation unit configured to irradiate the thermally-expandable sheet 100 with energy by emitting the light of such a wavelength range.

When the thermally-expandable sheet 100 on which the grayscale image has been printed by the black ink containing carbon black is irradiated with light (energy), the light is more efficiently converted to heat in a portion where the grayscale image has been printed than in a portion where the grayscale image has not been printed. Thus, the portion of the thermally-expandable sheet 100 where the grayscale image has been printed is mainly heated and distends when the thermal-expandable agent reaches a temperature at which distension starts. The irradiator 60 functions as a thermal distension unit configured to thermally distend the thermally-expandable sheet 100 by emitting light (energy) while being conveyed by the conveyance motor 55. Incidentally, the light emitted by the lamp heater 61 may be the electromagnetic wave, and is not limited to the light in the above-described wavelength range.

The reflection plate 62 is arranged so as to cover the upper side of the lamp heater 61, and is a mechanism that reflects the light emitted from the lamp heater 61 toward the thermally-expandable sheet 100.

The temperature sensor 63 is a thermocouple, a thermistor, or the like, and functions as a measurement unit configured to measure the temperature of the reflection plate 62.

The air-blowing unit 64 is provided above the reflection plate 62. The air-blowing unit 64 includes at least one fan and functions as an air-blowing unit configured to cool the irradiator 60 by blowing air to the irradiator 60. More specifically, the air-blowing unit 64 sucks the air outside the expansion device 50 from an air supply port provided at the top of the air-blowing unit 64, and sends the sucked air to the irradiator 60. The air sucked by the air-blowing unit 64 is supplied to the reflection plate 62, and the reflection plate 62 is cooled by the air. Further, the air sucked by the air-blowing unit 64 is supplied to the inside of the expansion device 50 through the irradiator 60, and the respective units in the housing 51 including the thermally-expandable sheet 100 placed on the tray 53 are cooled.

The barcode reader 65 functions as a reading unit configured to read identifiers provided at predetermined positions of the thermally-expandable sheets 100a and 100b. More specifically, the barcode reader 65 reads the barcode B1 attached to the back face of the thermally-expandable sheets 100a and 100b and the barcode B2 attached to the front face of the thermally-expandable sheet 100a. The barcode reader 65 includes a light source and an optical sensor, and optically reads the barcodes B1 and B2 in a well-known method. The barcode reader 65 is attached to the irradiator 60 and moves together with the irradiator 60.

Figure 10:
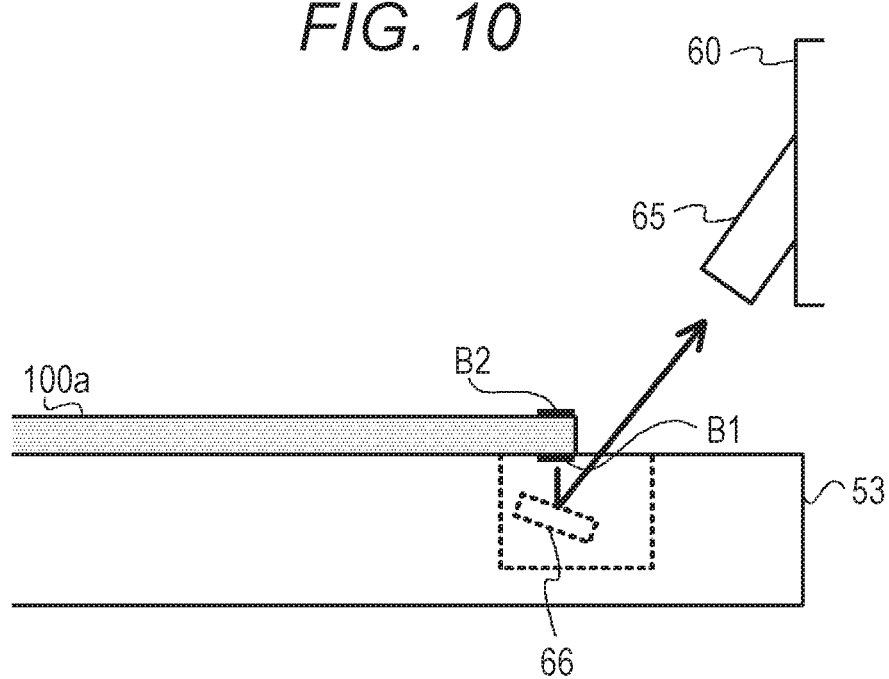
FIG. 10 is a view illustrating a state where a barcode is read from a lower side of a thermally-expandable sheet by the expansion device according to the first embodiment.
Figure 11:
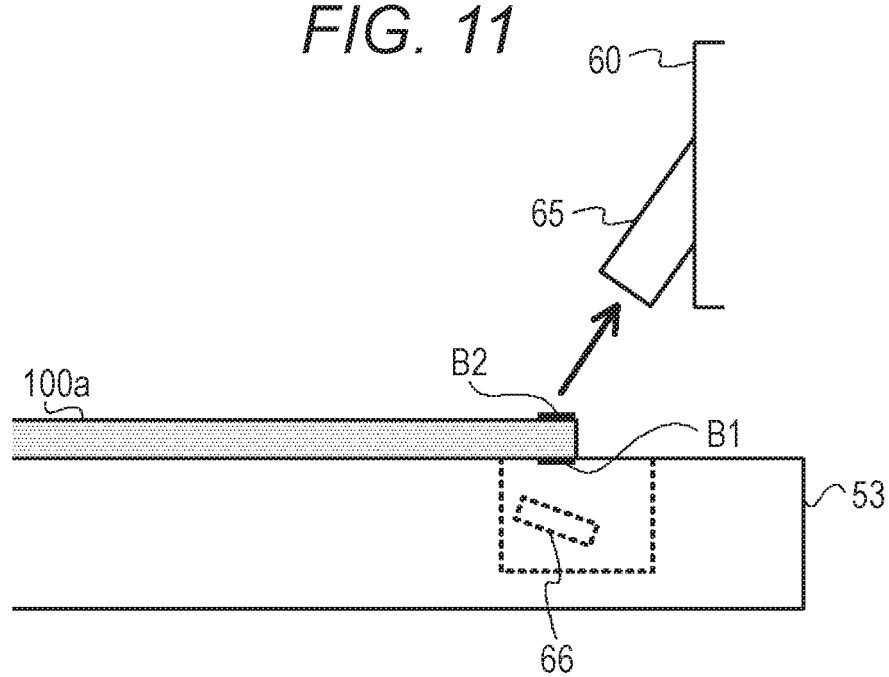
FIG. 11 is a view illustrating a state where the barcode is read from an upper side of the thermally-expandable sheet by the expansion device according to the first embodiment.

FIGS. 10 and 11 illustrate a state where the periphery of the edge portion on the back side of the thermally-expandable sheet 100a placed in the tray 53 is enlarged. FIGS. 10 and 11 illustrate a case, as an example, where the thermally-expandable sheet 100a is placed on the tray 53 with the front face thereof facing upward. A reflector 66 is provided on the lower side of the thermally-expandable sheet 100a placed on the tray 53. The reflector 66 is a reflecting mirror configured to allow the barcode reader 65 to read the barcodes B1 and B2 from the lower side of the thermally-expandable sheets 100a and 100b.

As illustrated in FIG. 10, when the irradiator 60 is at a first reading position, the barcode reader 65 reads the barcode B1 attached to the back face of the thermally-expandable sheet 100a via the reflector 66. Further, as illustrated in FIG. 11, when the irradiator 60 is at a second reading position, the barcode reader 65 directly reads the barcode B2 attached to the front face of the thermally-expandable sheet 100a without the intervention of the reflector 66. In this manner, the barcode reader 65 can read the two types of barcodes B1 and B2 attached to the front face and the back face of the thermally-expandable sheet 100a by using the reflector 66.

Returning to FIG. 9, the power supply board 69 includes a power supply integrated circuit (IC) and the like, and generates and supplies necessary power to the respective units in the expansion device 50. For example, the ventilation unit 54, the conveyance motor 55, the lamp heater 61, and the air-blowing unit 64 operate by obtaining the power from the power supply board 69.

Figure 12:
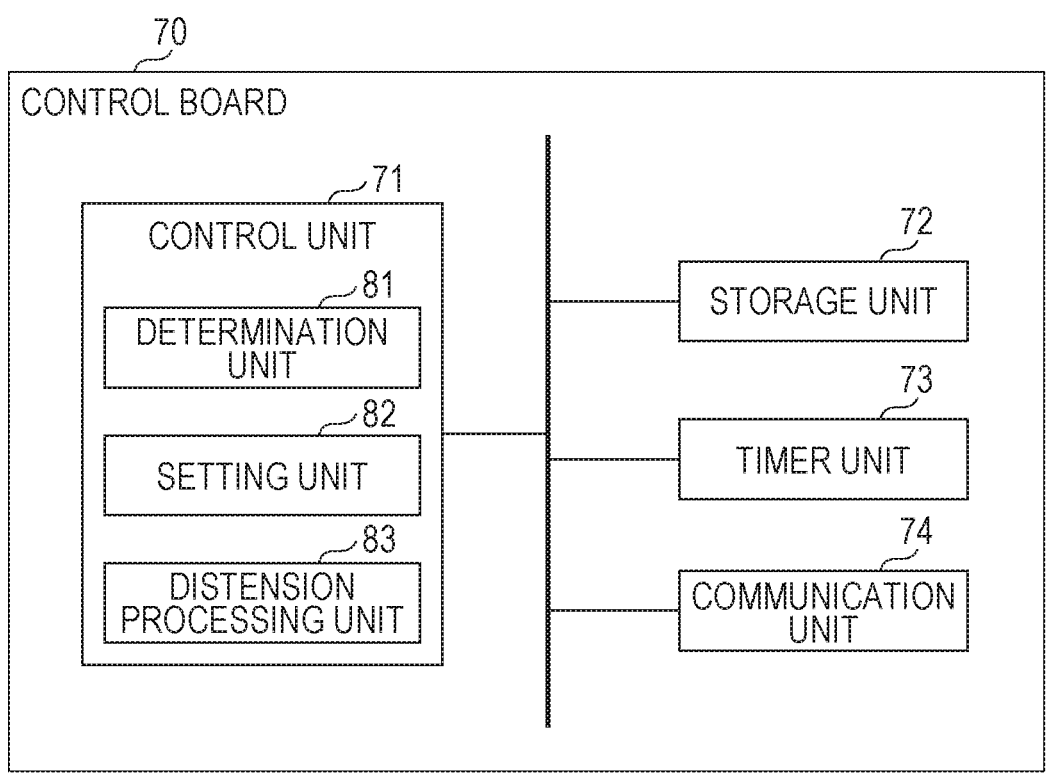
FIG. 12 is a block diagram illustrating a configuration of a control board of the expansion device according to the first embodiment.

The control board 70 is provided on a board arranged below the housing 51 and controls the operation of each unit of the expansion device 50. As illustrated in FIG. 12, the control board 70 includes a control unit 71, a storage unit 72, a timer unit 73, and a communication unit 74.

The control unit 71 includes a CPU, a ROM, and a RAM, and is connected to each unit of the expansion device 50 via a system bus that is a transmission path configured to transfer a command and data. The CPU is, for example, a microprocessor or the like, and is a central processing unit that executes various processes and operations. In the control unit 71, the CPU reads a control program stored in the ROM and controls the entire operation of the expansion device 50 while using the RAM as a work memory.

The storage unit 72 is nonvolatile memory such as flash memory and a hard disk. The storage unit 72 stores a program or data to be executed by the control unit 71 and data generated or acquired as the control unit 71 performs various processes. The timer unit 73 includes a timer device such as a real time clock (RTC), and keeps counting time even while the power of the expansion device 50 is off.

The communication unit 74 has an interface for communication with the terminal device 30. The communication unit 74 performs wired or wireless communication with the terminal device 30 under the control of the control unit 71. For example, the communication unit 74 acquires an instruction to start the electromagnetic wave irradiation process, which has been input from the user in the terminal device 30, from the terminal device 30. Further, the communication unit 74 transmits information indicating a current state of the expansion device 50 to the terminal device 30.

As illustrated in FIG. 12, the control unit 71 functionally includes a determination unit 81 functioning as a determination unit, a setting unit 82 functioning as a setting unit, and a distension processing unit 83 functioning as a distension processing unit. In the control unit 71, the CPU reads the program stored in the ROM to the RAM and executes and controls the program to function as these respective units.

The determination unit 81 determines a type and an orientation of the thermally-expandable sheet 100, which is a target for forming a three-dimensional image, based on results of reading the barcodes B1 and B2 by the barcode reader 65. To determine the type of the thermally-expandable sheet 100 means to determine whether the thermally-expandable sheet 100 placed on the tray 53 is the thermally-expandable sheet 100a including the peeling layer 107 or the thermally-expandable sheet 100b not including the peeling layer 107. In addition, to determine the orientation of the thermally-expandable sheet 100 means to determine whether the thermally-expandable sheet 100 is placed on the tray 53 with the front face facing upward or with the back face facing upward.

FIG. 13 illustrates a correspondence relationship between the results of reading the barcodes B1 and B2 and the type and the orientation of the thermally-expandable sheet 100.

In FIG. 13, "reading of lower side of sheet" corresponds to a case where the barcode reader 65 performs reading via the reflector 66 as in the example of FIG. 10, and "reading of upper side of sheet" corresponds to a case where the barcode reader 65 performs reading without the intervention of the reflector 66 as in the example of FIG. 11. In addition, "none" corresponds to a case where neither the barcode B1 nor the barcode B2 has been read.

When the barcode B1 is read as the result of the reading of the lower side of the thermally-expandable sheet 100 (corresponding to the case of "1" or "2" in FIG. 13), the determination unit 81 determines that the thermally-expandable sheet 100 is placed on the tray 53 with the front face facing upward. Further, the determination unit 81 determines that the thermally-expandable sheet 100 includes the peeling layer 107 when the barcode B2 is read as the result of the reading the upper side of the thermally-expandable sheet 100, and determines that the thermally-expandable sheet 100 does not include the peeling layer 107 when the barcode B2 has not been read.

On the other hand, when the barcode B1 is read as the result of the reading of the upper side of the thermally-expandable sheet 100 (corresponding to the case of "3" or "4" in FIG. 13), the determination unit 81 determines that the thermally-expandable sheet 100 is placed on the tray 53 with the back face facing upward. Further, the determination unit 81 determines that the thermally-expandable sheet 100 includes the peeling layer 107 when the barcode B2 is read as the result of the reading the lower side of the thermally-expandable sheet 100, and determines that the thermally-expandable sheet 100 does not include the peeling layer 107 when the barcode B2 has not been read.

However, when the thermally-expandable sheet 100a including the peeling layer 107 is distended from the back face, the thermally-expandable sheet 100a is generally placed on the tray 53 after peeling off the peeling layer 107 as will be described later. Thus, in the case of "3" in FIG. 13, the determination unit 81 may determine that the thermally-expandable sheet 100a has been erroneously placed, that is, that an error has occurred. When the results other than the above-described results are obtained as the result of reading the lower side and the upper side of the thermally-expandable sheet 100 (corresponding to the case of "5" in FIG. 13), a sheet other than the dedicated sheet that can be distended by the expansion device 50 is placed on the tray 53. In this case, the determination unit 81 determines that an error has occurred.

In this manner, the determination unit 81 determines the type and the orientation of the thermally-expandable sheet 100 that has been inserted in the expansion device 50 based on the results of reading the barcodes B1 and B2 performed by the barcode reader 65.

Returning to FIG. 12, the setting unit 82 sets a condition to distend the thermally-expandable sheet 100 depending on whether the barcode B2 as well as the barcode B1 has been read as the results of reading the barcodes B1 and B2 performed by the barcode reader 65. The condition to distend the thermally-expandable sheet 100 is a condition for an operation of the expansion device 50 in a distension process performed by the distension processing unit 83. The setting unit 82 refers to a result of determination performed by the determination unit 81 and sets the condition to distend the thermally-expandable sheet 100 in accordance with the type and the orientation of the thermally-expandable sheet 100 which have been determined by the determination unit 81.

The setting unit 82 sets a movement speed of the irradiator 60 as the condition to distend the thermally-expandable sheet 100. The movement speed of the irradiator 60 is a speed at which the irradiator 60 is moved from a first position P1 to a second position P2 at the time of distending the thermally-expandable sheet 100. When the movement speed of the irradiator 60 changes, movement time during which the irradiator 60 moves from the first position P1 to the second position P2, that is, irradiation time by the irradiator 60 changes, and thus, the amount of light (energy) with which each portion of the thermally-expandable sheets 100 is irradiated also changes. Thus, to set the movement speed corresponds to set the amount of energy per unit area to be emitted on the thermally-expandable sheet 100 by the irradiator 60.

The setting unit 82 sets the movement speed of the irradiator 60 in consideration of such a relationship between the movement speed and the irradiation time. In particular, the thermally-distensible layer 102 is heated by the heat from the front face of the peeling layer 107, the transmission of heat is weakened in the thermally-expandable sheet 100a including the peeling layer 107 by the extent corresponding to the thickness of the peeling layer 107 as compared to the thermally-expandable sheet 100b not including the peeling layer 107. Thus, when the thermally-expandable sheet 100 is placed on the tray 53 with the front face facing upward (in the case of "1" or "2" in FIG. 13), the setting unit 82 changes the movement speed of the irradiator 60 depending on the presence or absence of the peeling layer 107.

More specifically, the setting unit 82 sets a lower speed as the movement speed of the irradiator 60 in the case where the barcode B2 has been read by the barcode reader 65 than in the case where the barcode B2 has not been read by the barcode reader 65. In other words, the setting unit 82 sets the movement speed of the irradiator 60 to be lower because the state of heat transmission becomes weaken in the case of emitting light from above the peeling layer 107 than in the case of not including the peeling layer 107. Accordingly, the irradiation time becomes long, and the amount of energy per unit area to be emitted on the thermally-expandable sheet 100 is set to a larger amount.

In this manner, the irradiation amount of light is increased in the case where the peeling layer 107 is present as compared to the case where the peeling layer 107 is absent, and thus, it is possible to perform adjustment such that the same degree of heat is transferred to the thermally-distensible layers 102 of both the thermally-expandable sheets 100a and 100b when grayscale images having the same degree of density have been printed on the front faces of the two types of thermally-expandable sheets 100a and 100b, respectively.

Incidentally, when the thermally-expandable sheet 100 is placed on the tray 53 with the back face facing upward as the result of the determination performed by the determination unit 81 (in the case of "3" or "4" in FIG. 13), the peeling layer 107 is not irradiated with light regardless of the presence or absence of the peeling layer 107. Thus, in this case, the setting unit 82 sets the movement speed of the irradiator 60 to the same speed regardless of whether the barcode B2 has been read by the barcode reader 65.

<Distension Process>

The distension processing unit 83 executes the distension process of distending the thermally-expandable sheet 100 in a state where the grayscale image containing carbon black has been printed on the front face or the back face thereof. More specifically, the distension processing unit 83 causes the irradiator 60 to emit light while moving the irradiator 60 by the conveyance motor 55 based on the condition set by the setting unit 82.

FIG. 14 illustrates a state where the expansion device 50 executes the distension process. In the distension process, the distension processing unit 83 supplies a power supply voltage to the irradiator 60 to turn on the lamp heater 61. Then, the distension processing unit 83 drives the conveyance motor 55 in a state where the irradiator 60 is caused to emit light, and moves the irradiator 60 at the movement speed set by the setting unit 82. Accordingly, the irradiator 60 moves from the first position P1 to the second position P2, that is, in the first direction. In this manner, the distension processing unit 83 irradiates the entire front or back face of the thermally-expandable sheet 100 with light by moving the irradiator 60 from an end to an end of the thermally-expandable sheet 100.

When light is emitted by the irradiator 60, the portion of the thermally-expandable sheet 100 on which the grayscale image containing carbon black has been printed generates heat, and distends when heated to a prescribed distension temperature. The prescribed distension temperature is a temperature at which the thermal-expandable agent contained in the thermally-distensible layer 102 starts to distend, and is, for example, a temperature of about 80° C. to 120° C. When a portion of the thermally-expandable sheet 100 on which the grayscale image has been printed distends, a three-dimensional image is formed on the thermally-expandable sheet 100.

The distension processing unit 83 distends the thermally-expandable sheet 100 by causing the irradiator 60 to emit light while moving the irradiator 60 with the movement speed set by the setting unit 82 in this manner. At this time, when the thermally-expandable sheet 100a including the peeling layer 107 is placed on the tray 53 with the front face facing upward, the thermally-distensible layer 102 distends by heating from the front face of the peeling layer 107. On the other hand, when the thermally-expandable sheet 100b not including the peeling layer 107 is placed on the tray 53 with the front face facing upward, the thermally-distensible layer 102 distends by heating without the intervention of the peeling layer 107. Although a way of heat transfer varies depending on the presence or absence of the peeling layer 107 in this manner, the movement speed of the irradiator 60 is adjusted in accordance with the presence or absence of the peeling layer 107 as described above. Thus, it is possible to heat and distend any of the two types of the thermally-expandable sheets 100a and 100b to the same extent.

<Cooling Process>

After performing such distension process, the distension processing unit 83 executes a cooling process of cooling the irradiator 60 and the thermally-expandable sheet 100 while moving the irradiator 60 from the second position P2 toward the first position P1, that is, returning the irradiator 60 to the initial position.

Figure 15:
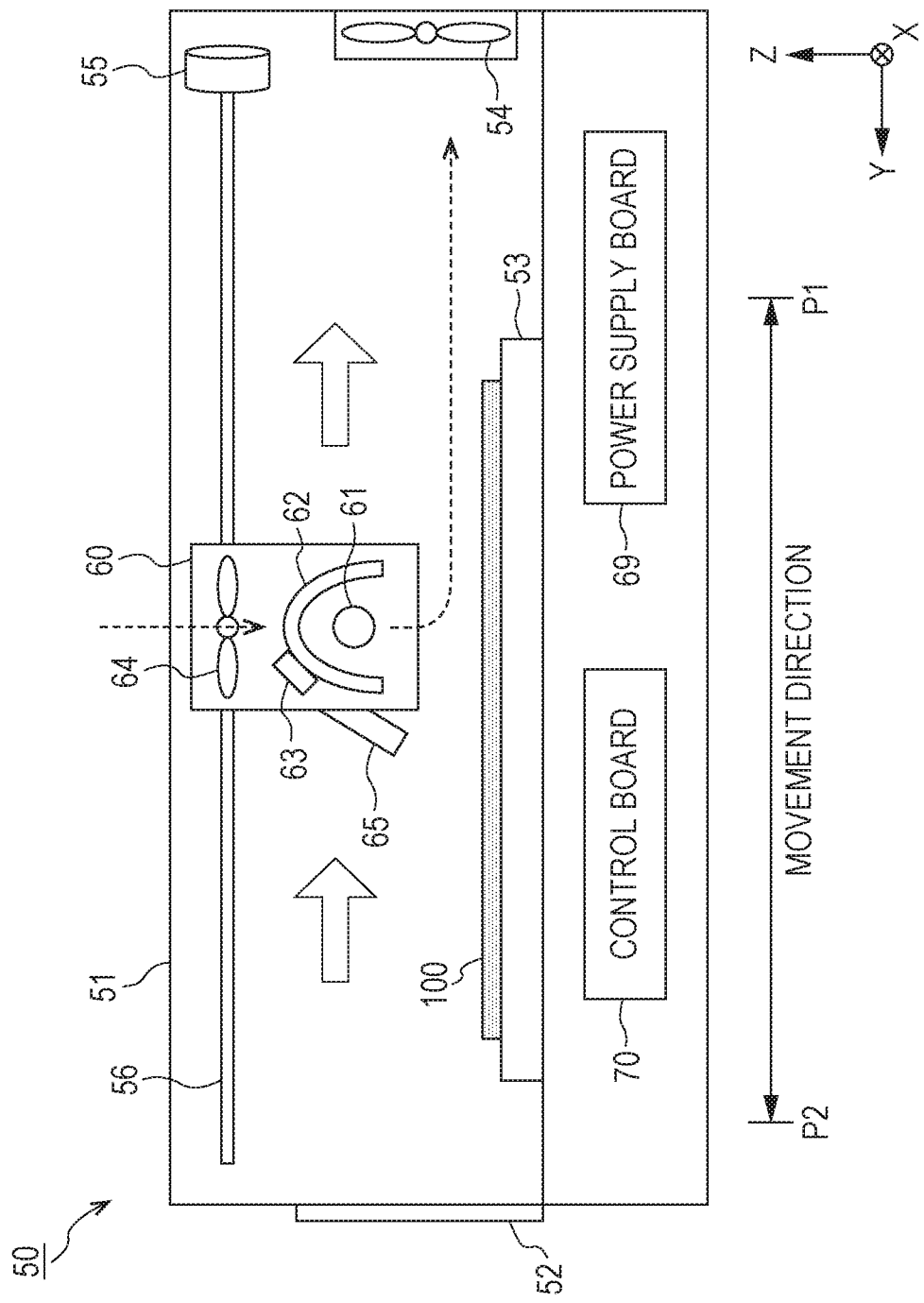
FIG. 15 is a diagram illustrating a state where the expansion device according to the first embodiment executes a cooling process.

FIG. 15 illustrates a state where the expansion device 50 executes the cooling process Immediately after the distension process, the irradiator 60 has reached the second position P2 on the front side of the expansion device 50. In the cooling process, the distension processing unit 83 causes the irradiator 60 to stop irradiation of light and causes the air-blowing unit 64 to blow air. Further, the distension processing unit 83 drives the conveyance motor 55 in the state where the air-blowing unit 64 is caused to blow air, thereby moving the irradiator 60 from the second position P2 toward the first position P1, that is, in the second direction.

At this time, the distension processing unit 83 drives the ventilation unit 54 to discharge the air inside the housing 51 to the outside. When the air-blowing unit 64 and the ventilation unit 54 are driven, the air which has been supplied from the outside by the air-blowing unit 64 flows to the back side of the expansion device 50 and is discharged from the ventilation unit 54 to the outside as illustrated in FIG. 15. Accordingly, the inside of the expansion device 50 is cooled and ventilated.

<Three-Dimensional Image Formation Process (Three-Dimensional Object Shaping Process)>

Figure 16:
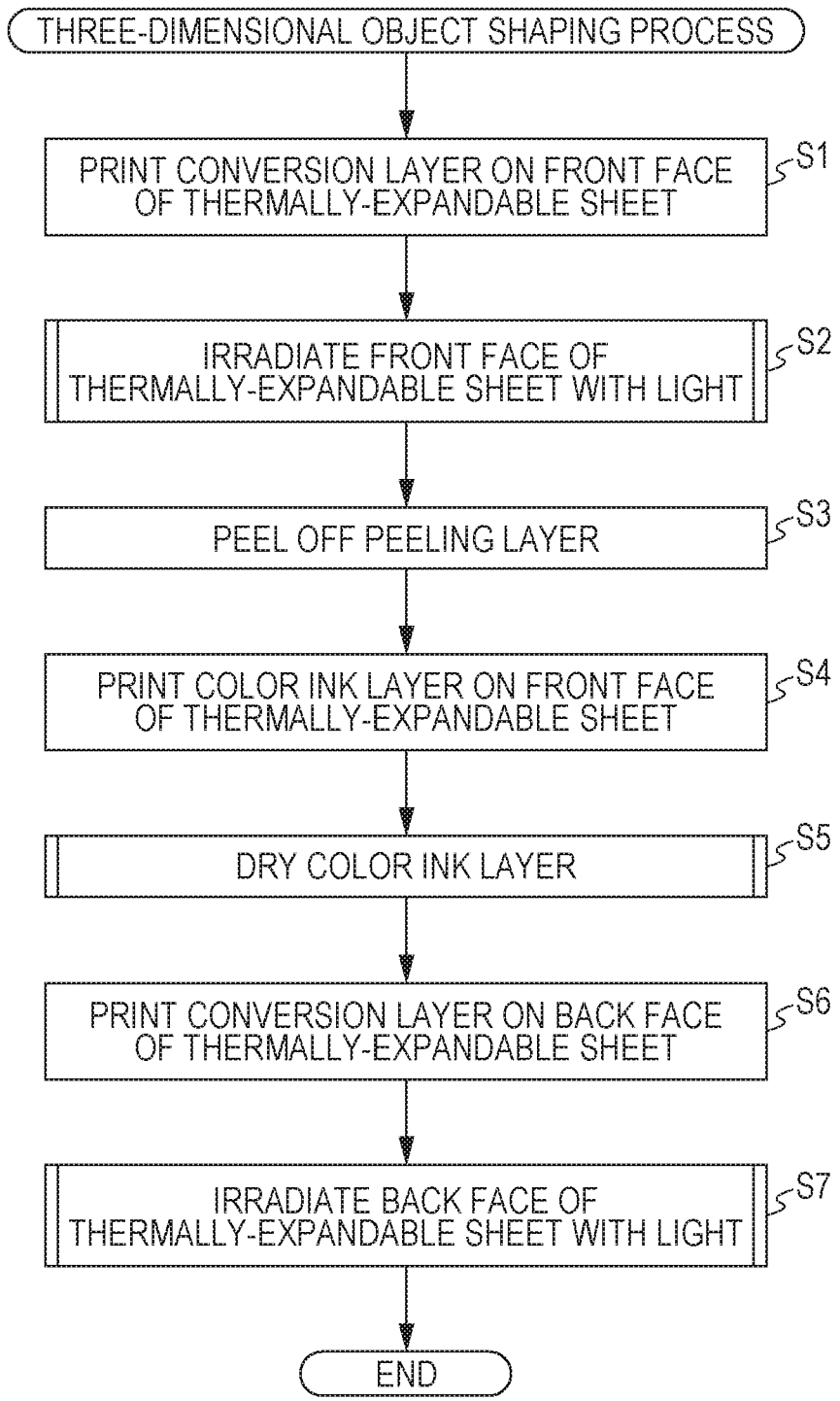
FIG. 16 is a flowchart illustrating a flow of a three-dimensional object shaping process according to the first embodiment.

A description will be given regarding flow of a three-dimensional image formation process (three-dimensional object shaping process) that is executed in the three-dimensional image forming system 1 configured as described above with reference to a flowchart illustrated in FIG. 16 and cross sectional views of the thermally-expandable sheet 100a illustrated in FIGS. 17A to 17F.

Figure 17A:
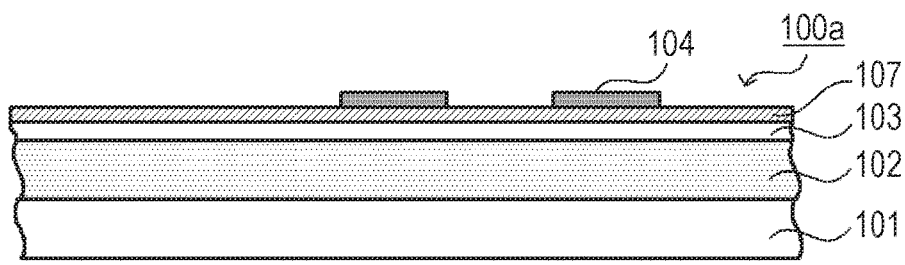
FIGS. 17A to 17F are views illustrating states where a three-dimensional image is formed on the thermally-expandable sheet illustrated in FIG. 1 in a stepwise manner.

Firstly, the user prepares the thermally-expandable sheet 100a before a three-dimensional image is formed thereon, and designates the color image data, the front face foaming data, and the back face foaming data via the operation unit 33 of the terminal device 30. Then, the thermally-expandable sheet 100a is inserted into the printing device 40 with the front face thereof facing upward. The printing device 40 prints a conversion layer 104 on the front face of the inserted thermally-expandable sheet 100a (Step S1). The conversion layer 104 is a layer that converts electromagnetic waves into heat, which is formed of a material that converts electromagnetic waves into heat, specifically a black ink containing carbon black. The printing device 40 ejects the black ink containing carbon black on the front face of the thermally-expandable sheet 100a, that is, the front face of the peeling layer 107 in accordance with the designated front face foaming data. Accordingly, the conversion layer 104 is formed on the peeling layer 107 as illustrated in FIG. 17A.

Figure 17B:
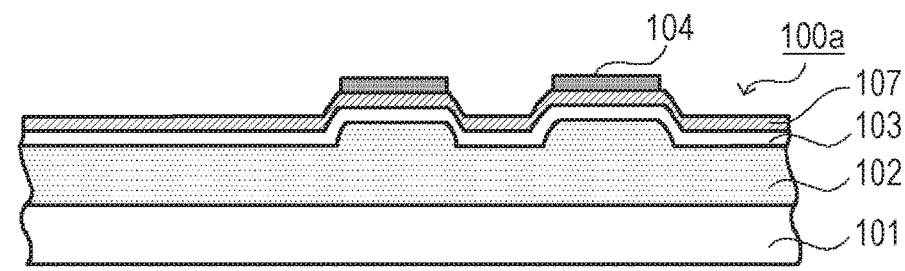

Secondly, the user inserts the thermally-expandable sheet 100a on which the conversion layer 104 has been printed into the expansion device 50 with the front face thereof facing upward. The expansion device 50 causes the irradiator 60 to irradiate the front face of the inserted thermally-expandable sheet 100a, that is, the front face of the peeling layer 107 with electromagnetic waves (Step S2). The conversion layer 104 that has been printed on the front face of the peeling layer 107 generates heat by absorbing the emitted electromagnetic waves. With such heating from the front face of the peeling layer 107, a portion of the thermally-distensible layer 102 on which the conversion layer 104 has been printed swells and distends as illustrated in FIG. 17B.

Figure 17C:
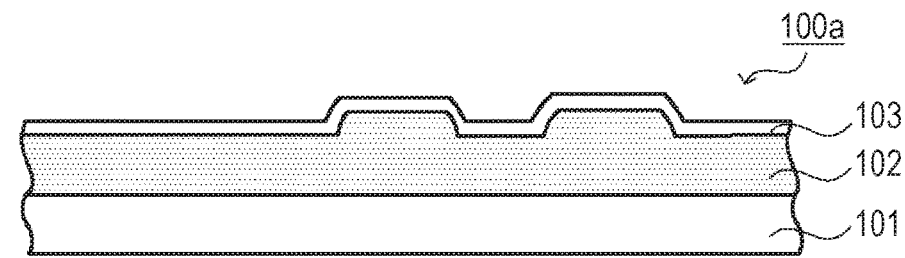

Thirdly, the user takes the distended thermally-expandable sheet 100a out of the expansion device 50 and peels off the peeling layer 107 (Step S3). As a result, the conversion layer 104 and the peeling layer 107 are removed from the thermally-expandable sheet 100a in the distended state, and the ink-receiving layer 103 appears on the front face as illustrated in FIG. 17C.

Figure 17D:
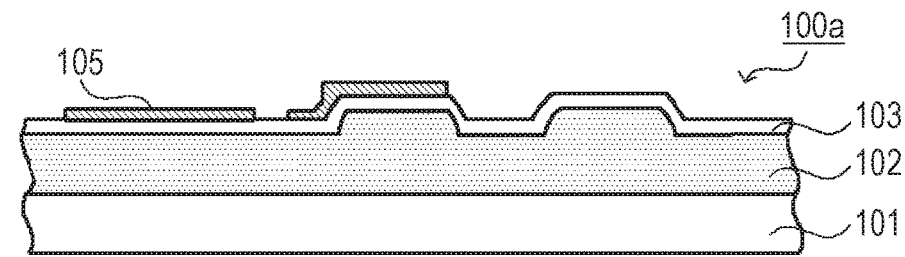

Fourthly, the user inserts the thermally-expandable sheet 100a whose front face has been heated and distended into the printing device 40 with the front face facing upward. The printing device 40 prints a color ink layer 105 on the front face of the inserted thermally-expandable sheet 100a (Step S4). More specifically, the printing device 40 ejects each ink of cyan C, magenta M, and yellow Y onto the front face of the thermally-expandable sheet 100 in accordance with the designated color image data. As a result, the color ink layer 105 is formed on the ink-receiving layer 103, and the front face of the thermally-expandable sheet 100a is colored as illustrated in FIG. 17D. Since the conversion layer 104 has been removed in Step S3, it is possible to print a clear color image in which the conversion layer 104 is not mixed.

Incidentally, when an image of a black or gray color is printed in the color ink layer 105, the printing device 40 forms the image by mixing inks of three colors of cyan C, magenta M, and yellow Y or by further using a black ink that does not contain carbon black. Accordingly, the portion formed by the color ink layer 105 avoids being heated in expansion device 50.

Fifthly, the user turns over the thermally-expandable sheet 100a on which the color ink layer 105 has been printed, and inserts the thermally-expandable sheet 100a into the expansion device 50 with the back face thereof facing upward. The expansion device 50 causes the irradiator 60 to irradiate the back face of the inserted thermally-expandable sheet 100a with electromagnetic waves, and heats the thermally-expandable sheet 100a from the back face. Accordingly, the expansion device 50 volatilizes a solvent contained in the color ink layer 105 to dry the color ink layer 105 (Step S5). The thermally-expandable sheet 100a is easily distended in a subsequent step by drying the color ink layer 105.

Figure 17E:
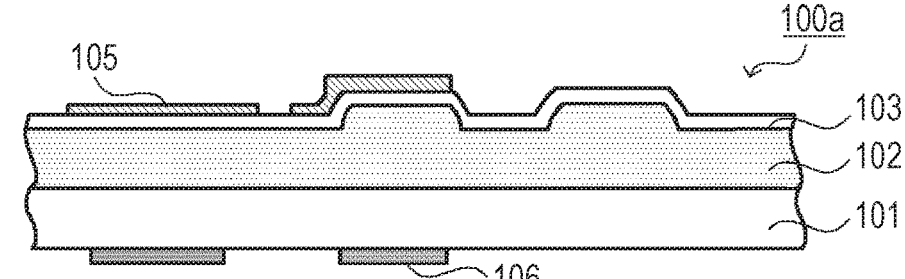

Sixthly, the user inserts the thermally-expandable sheet 100a on which the color ink layer 105 has been printed into the printing device 40 with the back face thereof facing upward. The printing device 40 prints a conversion layer 106 on the back face of the inserted thermally-expandable sheet 100a (Step S6). The conversion layer 106 is a layer formed using a material that converts electromagnetic waves into heat, specifically, a black ink containing carbon black, which is similar to the conversion layer 104 printed on the front face of the thermally-expandable sheet 100a. The printing device 40 ejects the black ink containing carbon black on the back face of the thermally-expandable sheet 100a in accordance with the designated back face foaming data. Accordingly, the conversion layer 106 is formed on the back face of the base member 101 as illustrated in FIG. 17E.

Figure 17F:
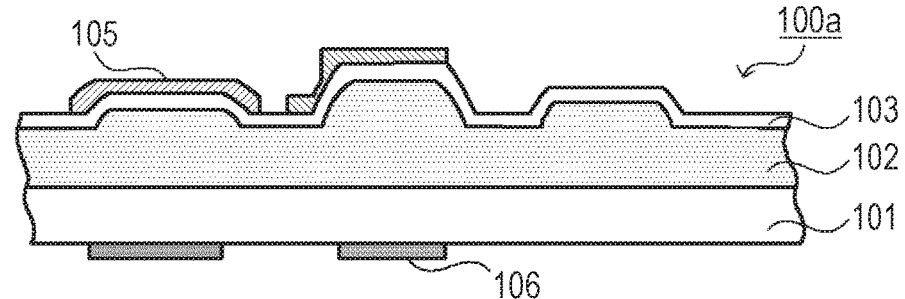

Seventhly, the user inserts the thermally-expandable sheet 100a on which the conversion layer 106 has been printed into the expansion device 50 with the back face thereof facing upward. The expansion device 50 irradiates the back face of the inserted thermally-expandable sheet 100a with electromagnetic waves by the irradiator 60 (Step S7). The conversion layer 106 which has been printed on the back face of the thermally-expandable sheet 100a generates heat by absorbing the emitted electromagnetic waves. Accordingly, a portion of the thermally-expandable sheet 100a on which the conversion layer 106 has been printed swells and distends as illustrated in FIG. 17F.

Incidentally, the color ink layers 105 are illustrated to be formed on the ink-receiving layer 103 in FIGS. 17A to 17F in order to facilitate understanding. However, more precisely, the color ink layer 105 is absorbed inside the ink-receiving layer 103, and thus, formed in the middle of the ink-receiving layer 103.

As described above, the three-dimensional color image is formed on the thermally-expandable sheet 100a as the portion of the thermally-expandable sheet 100a where the conversion layers 104 and 106 have been formed distends. Since the conversion layers 104 and 106 are heated to a greater extent at higher density, the conversion layers 104 and 106 dispend more. Thus, it is possible to shape various shapes of three-dimensional images (three-dimensional objects or shaped objects) by adjusting the grayscale of the conversion layers 104 and 106 in accordance with a target height.

In the case of forming a three-dimensional image on the thermally-expandable sheet 100b not including the peeling layer 107, the processes in Steps S1 and S2 is executed not on the front face of the peeling layer 107 but on the front face of the ink-receiving layer 103. In addition, the process of peeling off the peeling layer 107 in Step S3 is unnecessary. The other processes are the same as those in the case of forming the three-dimensional image on the thermally-expandable sheet 100a.

Any one of the process of heating the thermally-expandable sheets 100a and 100b from the front face and the process of heating the thermally-expandable sheets 100a and 100b from the back face may be omitted. For example, when only the front faces of the thermally-expandable sheets 100a and 100b are heated and distended, Steps S6 and S7 in FIG. 16 are omitted. On the other hand, when only the back faces of the thermally-expandable sheets 100a and 100b are heated and distended, Steps S1 and S2 in FIG. 16 are omitted.

The printing of the color image in Step S5 may be executed after the process of heating the thermally-expandable sheets 100a and 100b from the back face in Step S7. Further, when forming a three-dimensional monochrome image, the printing device 40 may print a monochrome image instead of the color image in Step S5. In this case, a layer made of a black ink is formed on the ink-receiving layer 103 instead of the color ink layer 105.

<Operation of Expansion Device 50>

Figure 18:
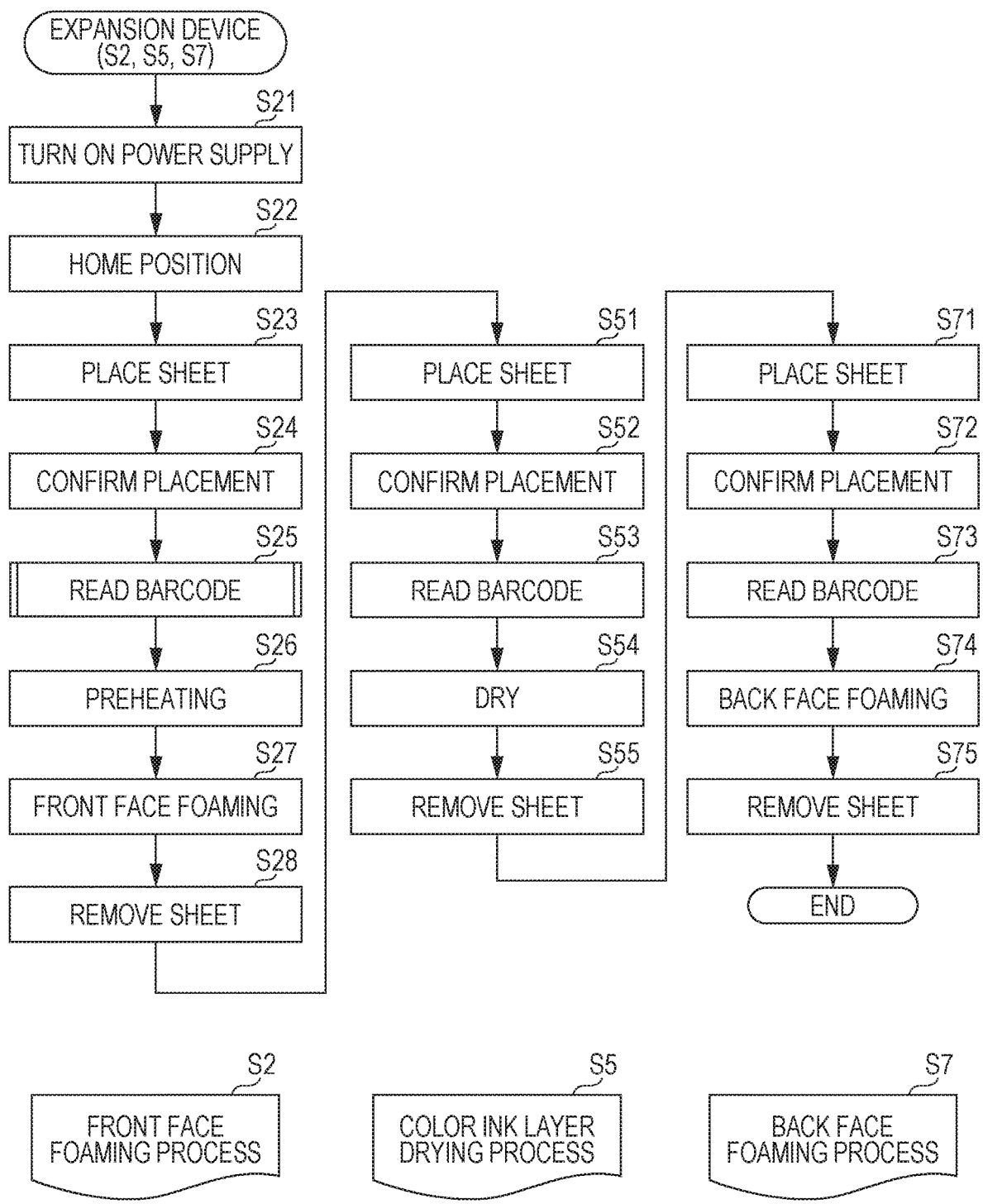
FIG. 18 is a flowchart illustrating a flow of a process that is executed by the expansion device according to the first embodiment.

Next, details of Steps S2, S5, and S7 executed by the expansion device 50 will be described with reference to a flowchart illustrated in FIG. 18.

In a front face foaming process (Step S2), when the user turns on the power supply (Step S21), the expansion device 50 sets the irradiator 60 at the home position (Step S22). Accordingly, the position of the irradiator 60 is initialized. Subsequently, the user opens the insertion section 52 to take out the tray 53 and places the thermally-expandable sheet 100 on the front face of which the conversion layer 104 has been printed in the printing device 40 on the tray 53 with the front face thereof facing upward (Step S23). The tray 53 on which the thermally-expandable sheet 100 has been placed is inserted into the housing 51 and arranged at the position that can be irradiated with electromagnetic waves by the irradiator 60.

Thereafter, the user operates the operation unit 33 of the terminal device 30 and inputs an instruction to distend the thermally-expandable sheet 100. When receiving the instruction input by the user from the terminal device 30, the control unit 71 of the expansion device 50 confirms the placement of the thermally-expandable sheet 100 (Step S24). If the thermally-expandable sheet 100 has not been correctly placed on the tray 53, the control unit 71 issues a warning to request the user to properly place the thermally-expandable sheet 100.

Subsequently, the control unit 71 executes a process of reading the barcodes B1 and B2 attached to the thermally-expandable sheet 100 via the barcode reader 65 (Step S25). Details of the process of reading of the barcodes B1 and B2 in Step S25 will be described with reference to a flowchart illustrated in FIG. 19.

When the process of reading the barcodes B1 and B2 illustrated in 19 is started, the control unit 71 firstly determines a result of reading the lower side of the thermally-expandable sheet 100 by the barcode reader 65 (Step S201). To read the lower side of the thermally-expandable sheet 100 means that the barcode reader 65 reads an edge portion of the lower side of the thermally-expandable sheet 100 placed on the tray 53 via the reflector 66 at the first reading position illustrated in FIG. 10.

At the time of front face foaming, the thermally-expandable sheet 100 is placed on the tray 53 with the front face facing upward. Thus, even if any of the two types of the thermally-expandable sheets 100a and 100b is placed in the tray 53, the barcode B1 needs to be read from the edge portion of the lower side of the thermally-expandable sheet 100 as long as the thermally-expandable sheet 100 is properly placed.

Thus, when the barcode B1 has not been read as the result of reading the lower side of the thermally-expandable sheet 100 (Step S201; Others), the control unit 71 determines that the thermally-expandable sheet 100 is not properly placed, and ends with an abnormality. In this case, the control unit 71 informs the user that the thermally-expandable sheet 100 has not been placed properly, and requests the user to properly place the thermally-expandable sheet 100.

On the other hand, when the barcode B1 has been read as the result of reading the lower side of the thermally-expandable sheet 100 (Step S201; Barcode B1), the control unit 71 secondly determines a result of reading the upper side of the thermally-expandable sheet 100 using the barcode reader 65 (Step S202). To read the upper side of the thermally-expandable sheet 100 means that the barcode reader 65 reads an edge portion of the upper side of the thermally-expandable sheet 100 placed on the tray 53 without the intervention of the reflector 66 at the second reading position illustrated in FIG. 11.

When nothing has been read as the result of reading the upper side of the thermally-expandable sheet 100 (Step S202; None), the control unit 71 determines that the peeling layer 107 is absent (Step S203). In other words, when confirming that the barcode B2 is not attached to the front face of the thermally-expandable sheet 100, the control unit 71 determines that the thermally-expandable sheet 100b not including the peeling layer 107 is provided on the tray 53.

When it is determined that the peeling layer 107 is absent, the control unit 71 sets the movement speed of the irradiator 60 to a first speed (Step S204). The first speed is the movement speed of the irradiator 60 set in advance as a speed for appropriately distending the thermally-expandable sheet 100b that does not include the peeling layer 107.

On the other hand, when the barcode B2 has been read as the result of reading the upper side of the thermally-expandable sheet 100 (Step S202; Barcode B2), the control unit 71 determines that the peeling layer 107 is present (Step S205). In other words, when confirming that the barcode B2 is attached to the front face of the thermally-expandable sheet 100, the control unit 71 determines that the thermally-expandable sheet 100a including the peeling layer 107 is provided on the tray 53.

When it is determined that the peeling layer 107 is present, the control unit 71 sets the movement speed of the irradiator 60 to a second speed (Step S206). The second speed is the movement speed of the irradiator 60 set in advance as a speed for appropriately distending the thermally-expandable sheet 100a that includes the peeling layer 107. Since the transfer of heat becomes weakened in the case where the peeling layer 107 is present than in the case where the peeling layer 107 is absent, the control unit 71 sets a speed lower than the first speed as the second speed.

Figure 19:
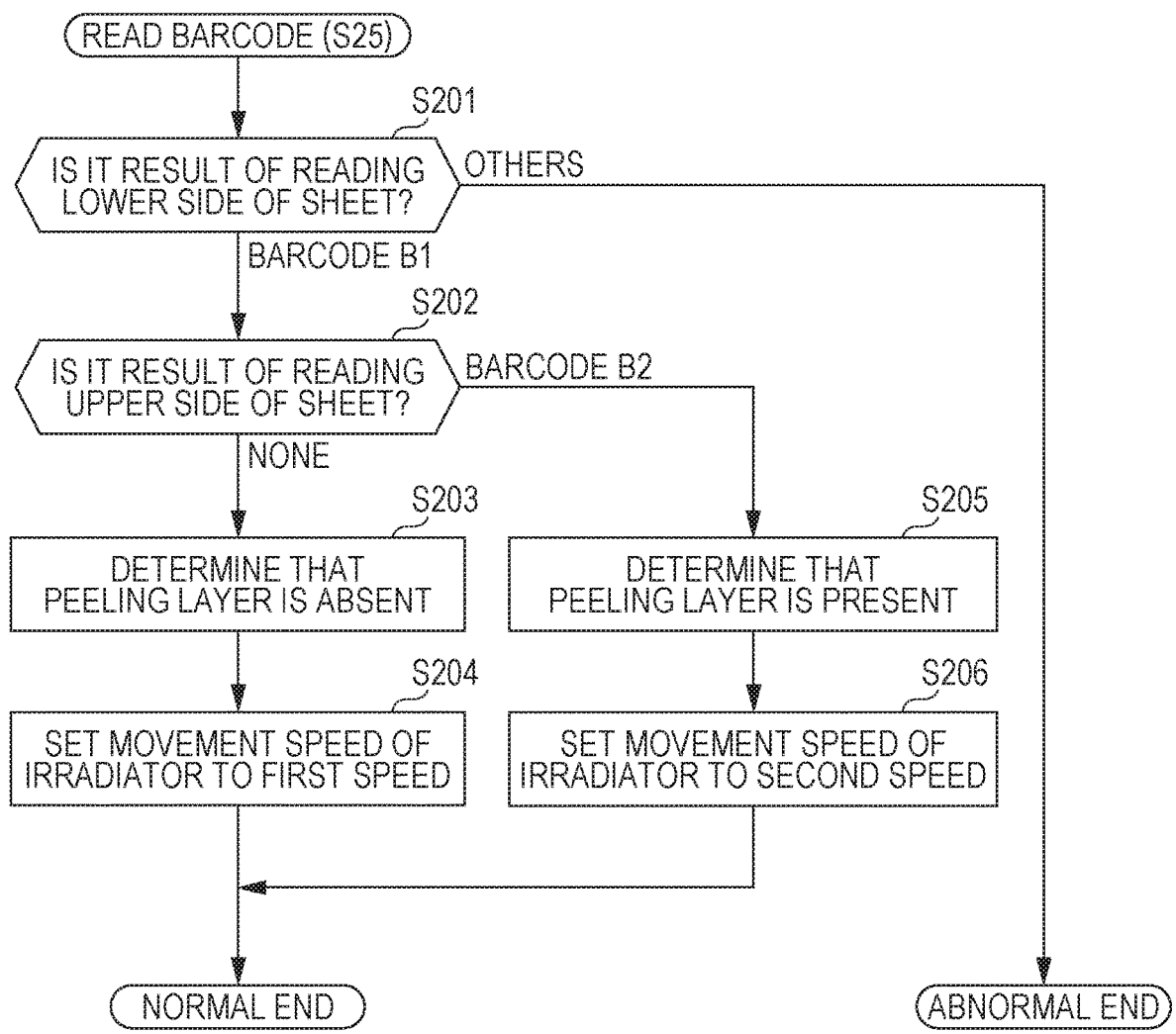
FIG. 19 is a flowchart illustrating a flow of a barcode reading process that is executed by the expansion device according to the first embodiment.

When the movement speed of the irradiator 60 is set to the first speed or the second speed, the process of reading of the barcodes B1 and B2 illustrated in FIG. 19 is ended. In Steps S201 to S203 and S205, the control unit 71 functions as the determination unit 81. In addition, in Steps S204 and S206, the control unit 71 functions as the setting unit 82.

A description will be given returning to the flowchart illustrated in FIG. 18. After execution of the process of reading of the barcodes B1 and B2, the control unit 71 executes preheating (a preheating process) (Step S26). The preheating process is a process of turning on the lamp heater 61 to heat and warm up the irradiator 60 in advance such that the expansion device 50 can smoothly start the distension process.

More specifically, the control unit 71 causes the irradiator 60 to emit electromagnetic waves by turning on the lamp heater 61 to raise the temperature of the irradiator 60 up to a preheating temperature set in advance. When the temperature of the reflection plate 62 rises to the preheating temperature, the control unit 71 causes the irradiator 60 to stop emitting the electromagnetic waves, and then, causes the air-blowing unit 64 to start blowing air. Accordingly, the control unit 71 lowers the temperature of the irradiator 60 to a temperature at which the expansion device 50 starts the distension process. In this manner, the control unit 71 executes the preheating.

After executing the preheating, the control unit 71 executes a front face foaming process (Step S27). More specifically, the control unit 71 causes the irradiator 60 to emit electromagnetic waves while moving the irradiator 60 in the first direction as illustrated in FIG. 14. At this time, the control unit 71 moves the irradiator 60 at the movement speed determined in Step S25. Accordingly, the control unit 71 heats the portion of the thermally-expandable sheet 100 on which the grayscale image has been printed to a temperature equal to or higher than the specified temperature, thereby distending the thermally-expandable sheet 100. Further, the control unit 71 causes the air-blowing unit 64 to blow air while moving the irradiator 60 in the second direction as illustrated in FIG. 15. Accordingly, the irradiator 60 and the thermally-expandable sheet 100 are cooled. In Step S27, the control unit 71 functions as the distension processing unit 83. Step S27 is an example of the thermal distension step.

After executing the front face foaming process, the user opens the insertion section 52, draws out the tray 53, and takes out the thermally-expandable sheet 100 from the expansion device 50 (Step S28). When the thermally-expandable sheet 100 includes the peeling layer 107, the user peels off the peeling layer 107. Thereafter, the thermally-expandable sheet 100 is inserted into the printing device 40, and the color ink layer 105 is printed on the front face thereof.

Subsequently, the processing of the expansion device 50 proceeds to the drying process (Step S5) of the color ink layer 105. The user places the thermally-expandable sheet 100 on the tray 53 with the front face on which the color ink layer 105 has been printed facing upward (Step S51). Subsequently, the control unit 71 confirms the placement of the thermally-expandable sheet 100 (Step S52) and reads the barcode B1 (Step S53).

The process of reading the barcode B1 is a process for confirming that the thermally-expandable sheet 100 is placed on the tray 53 with the front face facing upward. When the barcode B1 attached to the back face of the thermally-expandable sheet 100 has been read by the barcode reader 65 via the reflector 66, the control unit 71 determines that the thermally-expandable sheet 100 has been normally placed.

When the barcode B1 is read, the control unit 71 executes the drying process (Step S54). The drying process is a process for drying the color ink layer 105 which has been printed on the front face of the thermally-expandable sheet 100.

More specifically, the control unit 71 turns on the lamp heater 61 to cause the irradiator 60 to emit electromagnetic waves. Then, the control unit 71 drives the conveyance motor 55 in the state where the irradiator 60 emits the electromagnetic waves, and moves the irradiator 60 in the first direction. At this time, the control unit 71 moves the irradiator 60 at the speed set so as to heat the thermally-expandable sheet 100 to a temperature lower than the specified temperature such that the thermally-expandable sheet 100 does not distend. Through such a drying process, moisture contained in the thermally-expandable sheet 100 is evaporated, and the thermally-expandable sheet 100 is dried.

After moving the irradiator 60, the control unit 71 causes the irradiator 60 to stop emitting the electromagnetic waves, and then moves the irradiator 60 in the second direction to return to the home position. At this time, the control unit 71 cools the irradiator 60 and the thermally-expandable sheet 100 by causing the air-blowing unit 64 to blowing air while moving the irradiator 60 in the second direction.

After executing the drying process in this manner, the user opens the insertion section 52, draws out the tray 53, and takes out the thermally-expandable sheet 100 from the expansion device 50 (Step S55). The thermally-expandable sheet 100 is inserted into the printing device 40, and the conversion layer 106 is printed on the back face thereof.

Subsequently, the processing of the expansion device 50 proceeds to a back face foaming process (Step S7). The user places the thermally-expandable sheet 100 on the tray 53 with the back face on which the conversion layer 106 has been printed facing upward (Step S71). Subsequently, the control unit 71 confirms the placement of the thermally-expandable sheet 100 (Step S72) and reads the barcode B1 (Step S73).

The process of reading the barcode B1 is a process for confirming that the thermally-expandable sheet 100 is placed on the tray 53 with the back face facing upward. When the barcode B1 attached to the back face of the thermally-expandable sheet 100 has been read by the barcode reader 65 without the intervention of the reflector 66, the control unit 71 determines that the thermally-expandable sheet 100 has been normally placed.

When the barcode B1 is read, the control unit 71 executes the back face foaming process (Step S74). The back face foaming process of Step S74 can be similarly described by replacing the front face with the back face in the front face foaming process of Step S27. In Step S74, the control unit 71 functions as the distension processing unit 83.

After executing the back face foaming process, the user opens the insertion section 52, draws out the tray 53, and takes out the thermally-expandable sheet 100 from the expansion device 50 (Step S75). In this manner, the processing of the expansion device 50 illustrated in FIG. 18 ends. Accordingly, the thermally-expandable sheet 100 on which the desired three-dimensional image has been formed is obtained.

As described above, the expansion device 50 distends the thermally-expandable sheet 100 by causing the irradiator 60 to emit the electromagnetic waves while moving the irradiator 60 along the thermally-expandable sheet 100 in the three-dimensional image forming system 1 according to the first embodiment. At that time, the expansion device 50 sets the condition to distend the thermally-expandable sheet 100 in accordance with the result of reading the barcode B2 indicating the presence or absence of the peeling layer 107, and distends the thermally-expandable sheet 100 under the set condition. In this manner, it is possible to distend the thermally-expandable sheet 100 with high accuracy regardless of the presence or absence of the peeling layer 107 by changing the condition of distension in accordance with the presence or absence of the peeling layer 107. As a result, it is possible to form a high-quality three-dimensional image on the thermally-expandable sheet 100.

In particular, when the user sets the condition of distension manually in accordance with the presence or absence of the peeling layer 107, it takes much labor of the user, and an operation mistake such as a mistake in designation of a sheet and forgetting to peel off the peeling layer 107 also occurs. Since the presence or absence of the peeling layer 107 is automatically determined by reading the barcode B2 according to the expansion device 50 of the first embodiment, it is possible to reduce user's labor and the man-made operation mistake.

In addition, since the barcode B2 indicating the presence or absence of the peeling layer 107 is attached to the front face of the peeling layer 107 in the thermally-expandable sheet 100a according to the first embodiment, the barcode B2 also disappears when the peeling layer 107 is peeled off. Accordingly, even when the thermally-expandable sheet 100a from which the peeling layer 107 has been peeled off is placed on the tray 53, it is possible to determine that the peeling layer 107 has been peeled off so that the thermally-expandable sheet 100a can be distended under the appropriate condition.

Second Embodiment

Next, a second embodiment of the invention will be described. In the second embodiment, the same configurations as those of the first embodiment will not be described.

In the first embodiment, the barcode B2 indicating the presence or absence of the peeling layer 107 is attached to the front face of the peeling layer 107. Thus, the determination unit 81 determines that the peeling layer 107 is present when the barcode B2 has been read by the barcode reader 65. On the other hand, the determination unit 81 determines that the peeling layer 107 is absent when the barcode B2 has been read by the barcode reader 65 in the second embodiment. This will be described hereinafter.

FIG. 20 illustrates a front face of a thermally-expandable sheet 100c which is a first thermally-expandable sheet according to the second embodiment. The thermally-expandable sheet 100c includes the base member 101, the thermally-distensible layer 102, the ink-receiving layer 103, and the peeling layer 107 in this order, which is similar to the thermally-expandable sheet 100a according to the first embodiment. Thus, the front face of the thermally-expandable sheet 100c corresponds to the front face of the peeling layer 107. Incidentally, the front face of the peeling layer 107 is hatched in FIG. 20 in order to facilitate understanding. In the second embodiment, the peeling layer 107 includes a light-shielding layer to shield light and does not transmit visible light. For example, the peeling layer 107 may include an ink-receiving layer that receives an ink (a black ink containing carbon black) applied to the front face of the peeling layer 107, and the ink-receiving layer may function as the light-shielding layer.

As illustrated in FIG. 20, no barcode B2 is attached to the front face of the thermally-expandable sheet 100c. Instead, the thermally-expandable sheet 100c includes the barcode B2 at a position covered with the peeling layer 107 (indicated by a broken line in FIG. 20) such that the barcode B2 is not visually recognizable. Since the barcode B2 is hidden with the peeling layer 107 in this manner, the barcode B2 is not read by the barcode reader 65 in a state where the peeling layer 107 is present.

FIG. 21 illustrates a front face of the thermally-expandable sheet 100d which is a second thermally-expandable sheet according to the second embodiment. The thermally-expandable sheet 100d includes the base member 101, the thermally-distensible layer 102, and the ink-receiving layer 103 in this order similarly to the thermally-expandable sheet 100b according to the first embodiment, but does not include the peeling layer 107. Thus, the front face of the thermally-expandable sheet 100d corresponds to the front face of the ink-receiving layer 103.

As illustrated in FIG. 21, a plurality of barcodes B2 are attached to the front face of the thermally-expandable sheet 100d along an edge portion thereof. The barcode B2 is read by the barcode reader 65 and used as an identifier indicating that the thermally-expandable sheet 100d does not include the peeling layer 107. In other words, the barcode B2 in the first embodiment functions as the identifier indicating that the peeling layer 107 is present, but the barcode B2 in the second embodiment functions as the identifier indicating that the peeling layer 107 is absent. In the second embodiment, the two barcodes B1 and B2 are collectively referred to as a first identifier, and the barcode B1 and the barcode B2 are referred to as a predetermined part and the other part of the first identifier, respectively.

The three-dimensional image forming system 1 according to the second embodiment can form a three-dimensional image on the above-described two types of the thermally-expandable sheets 100c and 100d. The user can purchase the thermally-expandable sheet 100d as a sheet in the state of not including the peeling layer 107, or can obtain the thermally-expandable sheet 100d by peeling off the peeling layer 107 of the thermally-expandable sheet 100c.

Incidentally, the barcode B1 indicating that the thermally-expandable sheets 100c and 100d are dedicated sheets for forming a three-dimensional image is attached to each back face of the thermally-expandable sheets 100c and 100d. The back faces of the thermally-expandable sheets 100c and 100d are the same as the back faces of the thermally-expandable sheets 100a and 100b illustrated in FIG. 5 in the first embodiment, and thus, the description thereof will be omitted.

FIG. 22 illustrates a correspondence relationship between results of reading the barcodes B1 and B2 and a type and an orientation of the thermally-expandable sheet 100 in the second embodiment. In the expansion device 50 according to the second embodiment, the determination unit 81 determines the type and the orientation of the thermally-expandable sheet 100 from the results of reading the barcodes B1 and B2 by the barcode reader 65 based on the correspondence relationship illustrated in FIG. 22.

In the correspondence relationship illustrated in FIG. 22, the relationship regarding whether the barcode B2 has been read and regarding the presence or absence of the peeling layer 107 in the determination result are reversed, as compared with the correspondence relationship in the first embodiment illustrated in FIG. 13. More specifically, in the second embodiment, the determination unit 81 determines that the peeling layer 107 is absent in the case where the barcode B2 has been read (in the case of "1" and "3" in FIG. 22), and determines that the peeling layer 107 is present in the case where the barcode B2 has not been read (in the case of "2" and "4" in FIG. 22). The correspondence relationship between the results of reading the barcode B1 and the orientations of the thermally-expandable sheets 100c and 100d is the same as that in the first embodiment.

The setting unit 82 sets a condition to distend the thermally-expandable sheet 100 with reference to the determination result by the determination unit 81 as described above. More specifically, when the peeling layer 107 is present, the barcode B1 is read but the barcode B2 is not read. On the other hand, when the peeling layer 107 is absent, both the barcode B1 and barcode B2 are read. Thus, the setting unit 82 sets a lower speed as a movement speed of the irradiator 60 in the case where the barcode B2 has not been read even though the barcode B1 has been read by the barcode reader 65 than in the case where both the barcode B1 and the barcode B2 have been read by the barcode reader 65.

In this manner, the setting unit 82 sets the movement speed of the irradiator 60 to be lower in the case where the peeling layer 107 is present than in the case where the peeling layer 107 is absent. Accordingly, the irradiation time becomes long, and the amount of energy per unit area to be emitted on the thermally-expandable sheet 100 is set to a larger amount. As a result, when grayscale images of the same degree of density have been printed on the front faces of the two types of thermally-expandable sheets 100c and 100d, it is possible to perform adjustment such that the same degree of heat is transferred to the thermally-distensible layers 102 of both the sheets.

As described above, the thermally-expandable sheet 100c according to the second embodiment has the barcode B2 at the position covered with the peeling layer 107, and the thermally-expandable sheet 100d not including the peeling layer 107 has the barcode B2 at the front face thereof. The expansion device 50 sets the condition to distend the thermally-expandable sheet 100 in accordance with the result of reading the barcode B2, and distends the thermally-expandable sheet 100 under the set condition. In this manner, it is possible to distend the thermally-expandable sheet 100 with high accuracy regardless of the presence or absence of the peeling layer 107 by changing the condition of distension in accordance with the presence or absence of the peeling layer 107. As a result, it is possible to form a high-quality three-dimensional image on the thermally-expandable sheet 100.

Modified Example

Although the embodiments of the invention have been described as above, the above-described embodiments are merely examples, and an application range of the invention is not limited thereto. That is, the embodiments of the invention can be applied in various ways, and all embodiments fall within the scope of the invention.

For example, the barcode B2 which is the second identifier is printed, in advance, on the front face of the peeling layer 107 of the thermally-expandable sheet 100a in the above-described first embodiment. However, the second identifier may not be necessarily printed on the thermally-expandable sheet 100a in advance in the invention. For example, the second identifier may not be necessarily printed at the time of shipping and selling, and the printing device 40 may print the second identifier at the time of printing the conversion layer 104 on the front face of the thermally-expandable sheet 100a. In this case, the user inputs the fact that a printing target is the thermally-expandable sheet 100a including the peeling layer 107 via the operation unit 33 of the terminal device 30. When receiving such an input from the user, the printing device 40 prints the conversion layer 104 based on the front face foaming data and prints the second identifier at a position to be read by the barcode reader 65 on the peeling layer 107.

Alternatively, the user may paste a seal printed with the second identifier on the front face of the peeling layer 107 of the thermally-expandable sheet 100a. In this case, after the printing device 40 prints the conversion layer 104 on the front face of the peeling layer 107, the user pastes the seal on which the second identifier has been printed at the position to be read by the barcode reader 65 on the peeling layer 107.

In addition, the user may paste the peeling layer 107 to the thermally-expandable sheet 100b not including the peeling layer 107 to form the thermally-expandable sheet 100a including the peeling layer 107. In this case, the color ink layer 105 may be printed on the thermally-expandable sheet 100b before pasting the peeling layer 107 to the thermally-expandable sheet 100b. In other words, the user may paste the peeling layer 107 on the thermally-expandable sheet 100b on which the color ink layer 105 has been printed, print the conversion layer 104 on the peeling layer 107 to perform the front face foaming, and then, peel off the peeling layer 107.

In the above-described embodiments, the setting unit 82 sets the movement speed of the irradiator 60 as the condition to distend the thermally-expandable sheet 100. In the invention, however, the setting unit 82 may set a parameter other than the movement speed as the condition to distend the thermally-expandable sheet 100. For example, the setting unit 82 may set the intensity of electromagnetic waves emitted from the irradiator 60 in accordance with the results of reading the barcodes B1 and B2 by the barcode reader 65. In this case, the setting unit 82 sets a higher intensity as the intensity of light to be emitted by the irradiator 60 in the case where the barcode B2 has been read by the barcode reader 65 than in the case where the barcode B2 has not been read by the barcode reader 65. Such control of the output of the electromagnetic wave to be emitted from the irradiator 60, an irradiation time, an irradiation distance, the movement speed of the irradiator 60, and the like is called "electromagnetic wave control".

In the second embodiment, the peeling layer 107 includes the light-shielding layer, and the barcode B2 covered with the peeling layer 107 is not visually recognizable. In the invention, however, the peeling layer 107 may be transparent, that is, transmit visible light.

Figure 23:
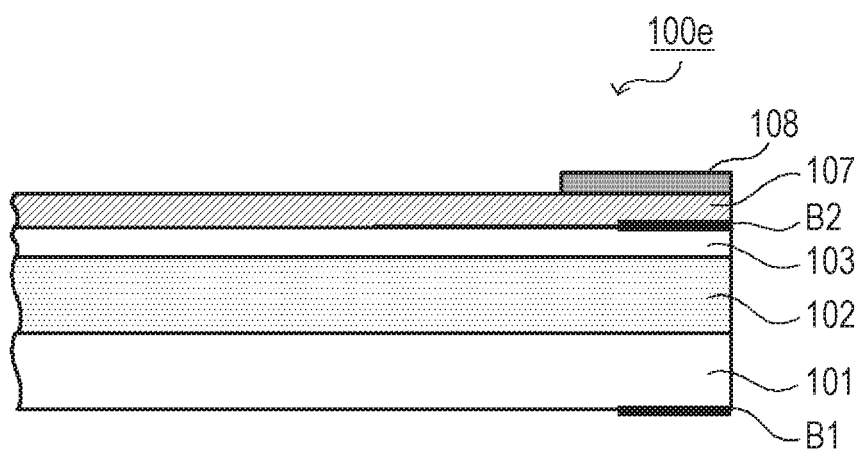
FIG. 23 is a cross-sectional view of a thermally-expandable sheet according to a modified example of the invention.

FIG. 23 illustrates an enlarged state of a cross section of an edge portion of a thermally-expandable sheet 100e including the transparent peeling layer 107 as a modified example of the second embodiment. The thermally-expandable sheet 100e includes the barcode B1 on the back face of the base member 101 and the barcode B2 at a position covered with the peeling layer 107, which is similar to the thermally-expandable sheet 100c according to the second embodiment. As illustrated in FIG. 23, the thermally-expandable sheet 100e further includes a light-shielding layer 108 that shields light at the position covering the barcode B2 on the transparent peeling layer 107. The light-shielding layer 108 serves a role of hiding the barcode B2 such that the barcode B2 is not read by the barcode reader 65 in a state where the peeling layer 107 is pasted. For example, an ink-receiving layer that receives a black ink as the conversion layer 104 may function as the light-shielding layer 108. As illustrated in FIG. 23, the light-shielding layer 108 may be provided only at the position covering the barcode B2 on the peeling layer 107, or may be provided on the entire front face of the peeling layer 107.

In the above-described embodiments, the peeling layer 107 is provided on the front faces of the thermally-expandable sheets 100a and 100c. In the invention, however, the peeling layer 107 may be provided on the back face of the thermally-expandable sheet 100. When the peeling layer 107 is provided on the back face, not only the barcode B1 but also the barcode B2 is provided on the back face. As the peeling layer 107 is provided on the back face, the conversion layer 106 formed on the back face can be removed by peeling off the peeling layer 107, and thus, it is possible to effectively utilize the back face of the thermally-expandable sheet 100.

In the above-described embodiments, the first and second identifiers are the barcodes B1 and B2. In the invention, however, the first and second identifiers are not limited to the barcodes B1 and B2, but may be characters, symbols, figures, and the like as long as the identifiers are information that is readable by the reading unit.

When the peeling layer 107 is provided on the back face, one character, symbol, figure, or the like may be provided as the first identifier on the back face of the thermally-expandable sheet 100, and a part of the first identifier may be covered with the peeling layer 107 or the light-shielding layer 108 provided thereon. In this case, the determination unit 81 determines that the peeling layer 107 is absent when the entire first identifier (that is, the entire character, symbol, figure, or the like) has been read as a result of the reading by the barcode reader 65, and determines that the peeling layer 107 is present when a part of the first identifier has not been read. In addition, when the peeling layer 107 is provided on the back face, the first identifier provided at a position not covered with the peeling layer 107 and the second identifier provided on the peeling layer 107 may be adjacent to each other such that the first identifier and the second identifier may be combined to express one character, symbol, figure, or the like. In this case, the determination unit 81 determines that the peeling layer 107 is present when both of the first identifier and the second identifier (that is, the entire character, symbol, figure, or the like) have been read as a result of the reading by the barcode reader 65, and determines that the peeling layer 107 is absent when the second identifier has not been read even though the first identifier has been read.

In addition, the barcode B2 indicating the presence or absence of the peeling layer 107 may be formed using an ink that is decolored by heating. The ink that is decolorized by heating is, for example, METAMOCOLOR (registered trademark) or the like, and is an ink of a color that is visually recognizable at room temperature which is the ink changing to a color that is not visually recognizable when heated. By forming the barcode B2 using the ink that is decolorized by heating, the barcode B2 disappears by heating the thermally-expandable sheet 100 to a prescribed temperature at the time of front face foaming. Since the barcode B2 disappears at the time of front face foaming in this manner, it is possible to improve the appearance of the thermally-expandable sheet 100 after the three-dimensional image is formed.

In the above-described embodiments, the distension processing unit 83 performs the distension process when moving the irradiator 60 from the first position P1 to the second position P2. In the invention, however, the control unit 71 may cause the irradiator 60 to reciprocate once or a plurality of times between the first position P1 and the second position P2 in order to execute the distension process if necessary.

In the above embodiment, the initial position (home position) of the irradiator 60 is on the back side of the expansion device 50. However, the initial position of the irradiator 60 may be on the front side of the expansion device 50. When the initial position of the irradiator 60 is on the front side of the expansion device 50, the description can be made similarly as the above embodiment by reversing the positional relationship between the first position P1 and the second position P2. Further, the ventilation unit 54 may be provided at a position other than the back side of the expansion device 50.

In the above embodiment, the thermally-expandable sheet 100 includes the base member 101, the thermally-distensible layer 102, and the ink-receiving layer 103. In the invention, however, the configuration of the thermally-expandable sheet 100 is not limited thereto. For example, the thermally-expandable sheet 100 does not necessarily include the ink-receiving layer 103. Alternatively, the thermally-expandable sheet 100 may be provided with a layer made of another arbitrary material between the base member 101 and the thermally-distensible layer 102, or between the thermally-distensible layer 102 and the ink-receiving layer 103. In addition, the thermally-expandable sheet 100 may also include the ink-receiving layer 103 on the front face of the peeling layer 107 or the back face of the base member 101. When the ink-receiving layer 103 is provided even on the front face of the peeling layer 107 or the back face of the base member 101, even the ink-receiving layer 103 may be also referred to as the peeling layer 107 or the base member 101.

In the above embodiment, the terminal device 30, the printing device 40, and the expansion device 50 are independent devices. In the invention, however, at least two of the terminal device 30, the printing device 40, and the expansion device 50 may be integrated.

In the above embodiment, the expansion device 50 includes the conveyance motor 55 as the moving unit configured to move the irradiator 60, and distends the thermally-expandable sheet 100 in a method for irradiating the thermally-expandable sheet 100 at a fixed position with light while moving the irradiator 60. However, the expansion device 50 may include a conveyance mechanism that conveys the thermally-expandable sheet 100 and distend the thermally-expandable sheet 100 in a method for irradiating the conveyed thermally-expandable sheet 100 with light from the irradiator 60 at a fixed position. In this case, the conveying mechanism functions as a moving unit that moves the thermally-expandable sheet 100, and the setting unit 82 sets the movement speed of the thermally-expandable sheet 100 instead of the movement speed of the irradiator 60. In this manner, the expansion device 50 may distend the thermally-expandable sheet 100 using any method as long as the thermally-expandable sheet 100 and the irradiator 60 can be moved relative to each other.

A printing method for the printing device 40 is not limited to the ink jet method. For example, the printing device 40 may be a laser printer, and an image may be printed using a toner and a developer. Further, the conversion layers 104 and 106 may be formed using a material other than black ink containing carbon black as long as the material easily converts light into heat. In this case, the conversion layers 104 and 106 may be formed by a means other than the printing device 40.

In the above-described embodiments, the control unit 71 of the expansion device 50 includes the CPU, and functions as the determination unit 81, the setting unit 82, and the distension processing unit 83 by the functions of the CPU. In the expansion device 50 according to the invention, however, the control unit 71 may include dedicated hardware such as an application specific integrated circuit (ASIC) and a field-programmable gate array (FPGA), various control circuits, or the like instead of the CPU, and the dedicated hardware may function as the determination unit 81, the setting unit 82, and the distension processing unit 83. In this case, the respective processes may be executed by individual hardware, or respective processes may be executed by a single piece of hardware. Further, some of the processes may be executed by dedicated hardware and others may be executed by software or firmware.

Incidentally, not only it is possible to provide an expansion device including the configuration for realizing the functions according to the invention in advance, but also it is possible to cause a computer that controls the expansion device to realize each functional configuration of the expansion device 50 exemplified in the above embodiment by application of a program. That is, it is possible to configure the program for realizing each functional configuration of the expansion device 50 exemplified in the above embodiment to be applied when being executed by a CPU or the like, which controls an existing information processing device or the like.

A method for applying such a program is arbitrary. The program can be applied in a form of being stored in a computer-readable storage medium such as a flexible disk, a CD-ROM, a DVD-ROM, and a memory card. Further, the program may be superimposed on a carrier wave and applied via a communication medium such as the Internet. For example, a program may be posted on a bulletin board system (BBS) on a communication network and distributed. Then, it may be configured such that the above processes can be executed by starting this program and executing the program in the same manner as other application programs under the control of an operating system (OS).

Although the preferred embodiments of the invention have been described as above, the invention is not limited to such specific embodiments, and the invention includes inventions described in the claims and equivalents thereof.

The invention claimed is:

1. An expansion device comprising:
   a thermal distension unit configured to thermally distend a thermally-expandable sheet by irradiating the thermally-expandable sheet with predetermined energy;
   a moving unit comprising a motor that is configured to relatively move the thermally-expandable sheet and the thermal distension unit with respect to one another so as to change a positional relationship between the thermally-expandable sheet and the thermal distension unit;
   a reading unit configured to read identifiers provided at predetermined positions of the thermally-expandable sheet;
   a setting unit configured to set an amount of energy per unit area to be emitted on the thermally-expandable sheet by the thermal distension unit depending on whether (i) a second identifier as well as a first identifier has been read, or (ii) whether a predetermined part of the first identifier has been read but another part has not been read, as a result of reading the identifiers by the reading unit; and
   a reflector that is arranged in the expansion device to face a first surface side of the thermally-expandable sheet in a state in which the thermally-expandable sheet is placed in the expansion device,
   wherein the reading unit comprises a sensor which is arranged in the expansion device to face a second surface side of the thermally-expandable sheet opposite the first surface side in the state in which the thermally-expandable sheet is placed in the expansion device, wherein the moving unit is configured to relatively move the sensor and the reflector with respect to one another so as to change a positional relationship between the sensor and the reflector, wherein the sensor and the reflector are arranged to be relatively movable by the moving unit such that the sensor and the reflector are relatively movable between (i) a first position at which the sensor is positioned to directly read the second surface side of the thermally-expandable sheet and (ii) a second position at which the sensor is positioned to indirectly read the first surface side of the thermally-expandable sheet via the reflector, in the state in which the thermally-expandable sheet is placed in the expansion device, wherein the identifiers are provided on at least one of the first surface side and the second surface side of the thermally-expandable sheet, and wherein the sensor is attached to the thermal distension unit so as to be relatively movable therewith with respect to the reflector and the thermally-expandable sheet by the same motor of the moving unit, whereby when the positional relationship between the thermal distension unit and the thermally-expandable sheet is changed by the motor of the moving unit, the positional relationship between the sensor and the reflector is correspondingly changed.

2. The expansion device according to claim 1, wherein the second identifier is provided on a peeling layer that is peelably provided on the thermally-expandable sheet.

3. The expansion device according to claim 1, wherein said another part of the first identifier is covered with a light-shielding layer provided on a peeling layer that is peelably provided on the thermally-expandable sheet.

4. The expansion device according to claim 1, wherein the setting unit sets a larger amount as the amount of energy in a case where the second identifier has been read by the reading unit than in a case where the second identifier has not been read by the reading unit.

5. The expansion device according to claim 1,
wherein the setting unit sets a larger amount as the amount of energy in a case where the predetermined part of the first identifier has been read by the reading unit but said another part of the first identifier has not been read than in a case where both the predetermined part and said another part of the first identifier have been read by the reading unit.

6. An expansion device comprising:
an irradiation unit configured to irradiate a thermally-expandable sheet with an electromagnetic wave;
a moving unit comprising a motor that is configured to relatively move the thermally-expandable sheet and the irradiation unit with respect to one another so as to change a positional relationship between the thermally-expandable sheet and the irradiation unit;
a reading unit configured to read identifiers provided at predetermined positions of the thermally-expandable sheet;
a setting unit configured to set a condition to distend the thermally-expandable sheet depending on whether (i) a second identifier as well as a first identifier has been read, or (ii) whether a predetermined part of the first identifier has been read but another part has not been read, as a result of reading the identifiers by the reading unit;
a distension processing unit configured to distend the thermally-expandable sheet by causing the irradiation unit to emit the electromagnetic wave while relatively moving the thermally-expandable sheet and the irradiation unit by the moving unit based on the condition set by the setting unit; and a reflector that is arranged in the expansion device to face a first surface side of the thermally-expandable sheet in a state in which the thermally-expandable sheet is placed in the expansion device, wherein the reading unit comprises a sensor which is arranged in the expansion device to face a second surface side of the thermally-expandable sheet opposite the first surface side in the state in which the thermally-expandable sheet is placed in the expansion device, wherein the moving unit is configured to relatively move the sensor and the reflector with respect to one another so as to change a positional relationship between the sensor and the reflector, wherein the sensor and the reflector are arranged to be relatively movable by the moving unit such that the sensor and the reflector are relatively movable between (i) a first position at which the sensor is positioned to directly read the second surface side of the thermally-expandable sheet and (ii) a second position at which the sensor is positioned to indirectly read the first surface side of the thermally-expandable sheet via the reflector, in the state in which the thermally-expandable sheet is placed in the expansion device, wherein the identifiers are provided on at least one of the first surface side and the second surface side of the thermally-expandable sheet, and wherein the sensor is attached to the irradiation unit so as to be relatively movable therewith with respect to the reflector and the thermally-expandable sheet by the same motor of the moving unit, whereby when the positional relationship between the irradiation unit and the thermally-expandable sheet is changed by the motor of the moving unit, the positional relationship between the sensor and the reflector is correspondingly changed.

7. The expansion device according to claim 6,
wherein the second identifier is provided on a peeling layer that is peelably provided on the thermally-expandable sheet.

8. The expansion device according to claim 6,
wherein said another part of the first identifier is covered with a light-shielding layer provided on a peeling layer that is peelably provided on the thermally-expandable sheet.

9. The expansion device according to claim 6, wherein:
the setting unit sets a relative movement speed between the thermally-expandable sheet and the irradiation unit moved by the moving unit as the condition, and
the distension processing unit distends the thermally-expandable sheet by causing the irradiation unit to emit the electromagnetic wave while relatively moving the thermally-expandable sheet and the irradiation unit using the moving unit at the movement speed set by the setting unit.

10. The expansion device according to claim 9, wherein the setting unit sets a lower speed as the movement speed in a case where the second identifier has been read by the reading unit than in a case where the second identifier has not been read by the reading unit.

11. The expansion device according to claim 9, wherein the setting unit sets a lower speed as the movement speed in a case where the predetermined part of the first identifier has been read by the reading unit but said another part of the first identifier has not been read than in a case where both the predetermined part and said another part of the first identifier have been read by the reading unit.

12. A three-dimensional image forming system comprising:
- the expansion device according to claim 6; and
- a printing device configured to print a conversion layer, which converts the electromagnetic wave emitted from the irradiation unit into heat, on the thermally-expandable sheet,
- wherein the distension processing unit distends a portion of the thermally-expandable sheet on which the conversion layer has been printed by causing the irradiation unit to emit the electromagnetic wave while relatively moving the thermally-expandable sheet on which the conversion layer has been printed by the printing device and the irradiation unit.

13. The three-dimensional image forming system according to claim 12,
- wherein the printing device prints the second identifier on a front face of a peeling layer that is peelably provided on the thermally-expandable sheet when printing the conversion layer on the thermally-expandable sheet.

\* \* \* \* \*